United States Patent [19]
Imai et al.

[11] Patent Number: 5,635,629
[45] Date of Patent: Jun. 3, 1997

[54] KNOCK SENSOR

[75] Inventors: Masahito Imai, Chita; Kenji Kanemaru, Okazaki; Norio Kitao; Nobuyasu Gotou, both of Nukata-gun; Naohito Mizuno, Kariya; Koichi Kamabora, Tokoname, all of Japan

[73] Assignee: Nippondenso Co., Ltd., Kariya, Japan

[21] Appl. No.: 411,719

[22] PCT Filed: Aug. 1, 1994

[86] PCT No.: PCT/JP94/01267

§ 371 Date: Apr. 3, 1995

§ 102(e) Date: Apr. 3, 1995

[87] PCT Pub. No.: WO95/04262

PCT Pub. Date: Feb. 9, 1995

Related U.S. Application Data

[63] Continuation-in-part of Ser. No. 198,052, Feb. 18, 1994, Pat. No. 5,507,182.

[30] Foreign Application Priority Data

Aug. 3, 1993  [JP]  Japan .................. 5-192219

[51] Int. Cl.$^6$ .............. G01L 1/10; G01L 23/22; G01H 9/00
[52] U.S. Cl. .................... 73/35.11; 73/35.13
[58] Field of Search .................. 73/35.01–35.09, 73/35.11–35.14, 115, 116, 117.2, 117.3, 653–655

[56] References Cited

U.S. PATENT DOCUMENTS

| | | | |
|---|---|---|---|
| 4,316,440 | 2/1982 | Yamaguchi et al. | 73/35.11 |
| 4,338,823 | 7/1982 | Iwasaki | 73/654 |
| 4,343,187 | 8/1982 | Kaji | 73/35.11 |
| 4,364,259 | 12/1982 | Muranaka et al. | 73/35.11 |
| 4,409,816 | 10/1983 | Yamaguchi et al. | 73/35.11 |
| 4,410,872 | 10/1983 | Stecher et al. | |
| 4,463,596 | 8/1984 | Asakura | 73/35.11 |
| 4,494,409 | 1/1985 | Kondo et al. | 73/35.11 |
| 4,562,740 | 1/1986 | Webber et al. | 73/35.11 |
| 4,872,348 | 10/1989 | Curry | 73/654 |
| 4,972,713 | 11/1990 | Iwata | 73/654 |
| 5,090,254 | 2/1992 | Guckel et al. | 73/653 |

FOREIGN PATENT DOCUMENTS

| | | |
|---|---|---|
| 138023 | 4/1985 | European Pat. Off. . |
| 57-99133 | 5/1982 | Japan . |
| 57-163837 | 10/1982 | Japan . |
| 58-178225 | 10/1983 | Japan . |
| 59-158566 | 9/1984 | Japan . |
| 60-32588 | 9/1985 | Japan . |
| 63-169078 | 7/1988 | Japan . |

OTHER PUBLICATIONS

Patent Abstract of Japan, vol. 006 No. 175 (P–141) Sep. 1982 re JP–A 57–093215.
Patent Abstract of Japan, vol. 012 No. 435 (E–683) Nov. 1988 re JP–A 63–169078.
Patent Abstract of Japan, vol. 011 No. 311 (P–625) Oct. 1987 re JP–A 62 103526.
Patent Abstract of Japan, vol. 007 No. 163 (M–229) Jul. 1958 re JP–A 58 070056.

*Primary Examiner*—Richard Chilcot
*Assistant Examiner*—George M. Dombroske
*Attorney, Agent, or Firm*—Cushman, Darby & Cushman

[57] ABSTRACT

A knock sensor for which a fabrication process is simple and moreover which can detect up to a high-frequency region is provided. A sensing element 11 composed of a semiconductor the weight (mass) thereof being 1 g or less and a signal processing circuit 11 are mounted on a fixing pedestal 9. The fixing pedestal 9 is fixed to a connector 2 side by means of adhesive or the like. Additionally, the connector 2 is fixed by means of caulking 16 of a housing 1. As a result thereof, the sensing element 11 is disposed within a space formed by the fixing pedestal 9 and the housing 1.

31 Claims, 21 Drawing Sheets

KNOCK SENSOR

This application is a continuation-in-part of earlier application Ser. No. 08/198,052 filed Feb. 18, 1994, now U.S. Pat. No. 5,507,182.

TECHNICAL FIELD

The present invention relates to a knock sensor to detect abnormal vibration due to a knocking phenomenon in an engine for a vehicle or the like.

BACKGROUND ART

A knock control system intended to control a knocking phenomenon, increase engine torque, and improve fuel consumption by sensing a knocking phenomenon in an engine of a vehicle or the like, conveying the presence or absence of the knocking phenomenon to an engine control unit (ECU), and controlling the ignition timing of spark plugs within cylinders of the engine with the ECU is known conventionally. This knock sensor senses vibration characteristic to the knocking phenomenon, and the vibration detector thereof has conventionally used a piezoelectric element composed of ceramic.

Broadly speaking, there are two types of detection methods for knock vibration of this knock sensor. One is a resonance type which causes a piezoelectric element to resonate together with a knocking frequency and detects output due to the resonance thereof as a knock signal, as is described in Japanese Patent Application Laid-open No. 62-96823 Patent Gazette, Japanese Patent Application Laid-open No. 59-164921 Patent Gazette, or Japanese Utility Model Application Laid-open No. 62-128332. The other is a flat type which detects a knock signal in a flat region in which an output signal output by a piezoelectric element is not subject to the influence of resonance, as described in Japanese Utility Model Application Laid-open No. 57-99133. Because the former causes resonance with the knock vibration, output with a good signal-to-noise ratio is obtained, but conversely only a unique knock vibration can be detected, and in the case of an engine with many cylinders it is impossible to detect knock vibration of all cylinders at a single location, and the problem exists that a plurality of knock sensors are required. On the other hand, the latter can detect knock vibration of various frequencies, but the possibility exists that, aside from the influence of the resonant frequency of the element itself, the vibration of other components may exert an influence on the vibration detection region, and there exists the problem wherein the degree of freedom in design of the knock sensor itself is narrow.

As the structure of these sensors, a structure disposing a piezoelectric element composed of a vibration detector within a space formed by a housing made of metal (or a housing composed of a strong material to be substituted thereby) having a projection of screw configuration so as to be installed directly on an engine and of a connector molded of resin which allows connector connection with an external portion is common.

Accordingly, there are two types of piezoelectric element installations: a type firmly fixed to the housing side by means of a screw or the like, and a type fixed in a state fixed to a stem of metal which becomes a fixing pedestal (or a strong fixing pedestal to be substituted thereby) on the connector side. Additionally, for the latter there exist, as similar types thereof, a type fixed to the stem, and not fixed directly to the connector side but fixed by means of caulking, and a type wherein the contact point of the step and housing are connected by means of gluing or welding or the like. That is to say, the latter can be termed a type fixed to the stem and disposed within a spaced formed by the stem and housing.

In a case where the piezoelectric element is fixed to the housing side, resonant frequency is high because the housing itself is made of metal, the housing itself does not resonate due to engine vibration, and influence thereof is not exerted on the piezoelectric element. However, it is necessary to perform the electrical connection from the piezoelectric element to the connector terminal by means of for example lead wires, the connector and housing must be fixed by means of caulking or the like to fix the piezoelectric element to the housing and connect the lead wires, and there exists the problem of a difficult fabrication process.

On the other hand, in a case of fixing to the connector side, because electrical connection from the piezoelectric elements to the connector terminal can be performed at the connector side, it is sufficient to fix a connector whereon a piezoelectric element is fixed to the housing by means of caulking or the like, and the fabrication process becomes simple. However, because the connector is generally made of resin, the resonant frequency is low, and in a case whereby the piezoelectric element is connected to the connector with nothing, resonance of the connector is conveyed without being attenuated by the piezoelectric element, and there exists a problem of influence being exerted on signal detection. To prevent this, mounting on a stem made of metal (or a strong material the Young's modulus of which is not less than metal) so as to impede vibration conveyance of the connector is required.

In this case, with a piezoelectric element of resonant type the detection signal is the resonance output of the piezoelectric element, and so there is no influence if output due to resonance of the connector or the like is to a certain extent smaller than that due to resonance of the piezoelectric element, but with a piezoelectric element of flat type, in a case whereby frequency thereof is a flat region, the signal-to-noise ratio may be caused to decline greatly, and so vibration from the connector must reliably be impeded by making the thickness of the stem thicker. This can be said to be the same also for the type connecting the contact point of the stem and housing by means of gluing or welding or the like. That is to say, with partial welding or the like adequate suppression of resonance of connector vibration cannot be performed.

Accordingly, this problem is subjected to the most influence by the weight of the piezoelectric element itself, and in a case of identical stem thickness, if the weight thereof becomes heavier the resonant frequency of the stem declines, and the influence thereof appears even more strongly. For this reason, it is necessary to cause the weight of the piezoelectric element to be reduced, but if this is done a problem of a drop in sensitivity appeared. Consequently, in order to avoid the influence of a decline in resonant frequency while maintaining sensitivity, the detection frequency region which assumes flat characteristics becomes a maximum of approximately 10 kHz, and the problem exists wherein detection up to a high-frequency region is not possible.

Accordingly, in view of this problem it is an object of the present idea to provide a knock sensor having a vibration detector of flat type capable of detecting a plurality of knock signals and fixed on a fixing pedestal as well as disposing the vibration detector within a space formed by the fixing pedestal and a housing, having a simple fabrication process and moreover capable of detection up to a high-frequency region without causing required sensitivity to decline.

The present inventors firstly made verification regarding the vibration detector. As a result of investigation by the present inventors, it was understood that in a case whereby the detection region of the knock signal is taken to be a maximum of approximately 15 kHz, the resonant frequency of a stem (made of metal) which does not overly influence this detection region becomes a minimum of approximately 40 kHz. When a stem thickness whereby resonant frequency becomes 40 kHz was investigated, it was understood that roughly 2.7 mm was required, as shown in FIG. 20. This is a simulation performed by means of the model indicated in FIG. 22, and this stem 30 takes the diameter thereof to be 19 mm, a region combining the vibration detector and other circuitry thereof is taken to be a load region 31, and the diameter of the surface on which the load region 31 is mounted is taken to be 16.5 mm. Additionally, this stem 30 has a step, and a weld portion M welded to a housing (not illustrated) is formed on the step surface thereof so as to approach actual stem configuration. As can be understood from this drawing as well, if stem thickness D is caused to change without changing the diameter, it is understood that the resonant frequency of the stem rises. This can be understood if it is considered that, wherein the weld portion M is fixed, there exists an image whereby a solid configuration is more difficult to vibrate than a plate configuration.

Additionally, FIG. 21 indicates change in resonant frequency of the stem in cases whereby stem thickness are taken to be 2.8 mm and 3.5 mm and further in a case whereby the load mounted on these stems is caused to change. FIG. 21 is data in a case whereby the load region 31 is caused to change from 0.1 g to 4.6 g. It is understood from this drawing that resonant frequency declines in a case whereby a load is applied to the stem. Consequently, even in a case whereby a load is applied increased thickness is required in order to maintain the resonant frequency at approximately 40 kHz. In a case whereby for example the load is taken to be 4.6 g, in order to make the resonant frequency of the stem to be 40 kHz, when in FIG. 21 the stem thickness is 2.8 mm the resonant frequency thereof is 20 kHz, and consequently it is necessary to double the resonant frequency. Accordingly, if in FIG. 20 the resonant frequency and stem thickness are taken to be in a linear relationship, a stem thickness of 4.4 mm becomes necessary.

In actuality, the weight of a piezoelectric element is approximately 20 g, and in order to cause the resonant frequency of a stem mounted with this piezoelectric element to be 40 kHz, if resonant frequency becomes 10 kHz when hypothetically the stem thickness is 2.8 mm in a case whereby load is taken to be 20 g, the stem thickness must be increased by 3 mm even at a low estimate to approximately 5.8 min.

Consequently, there is not only enlargement as a knock sensor, but in a case whereby a through-hole for the purpose of passing a pin to connect to the connector terminal is made in the stem by punching or cutting, when the strength of the punch pin or cutting drill is considered, it is necessary to make the diameter thereof to be approximately identical to the stem thickness, and it is necessary to form a considerably large through-hole on the stem. In a case of the foregoing stem, if a vibration detector of a piezoelectric element or the like is taken to be mounted on the surface on which load is applied, it is necessary to make a 5.8 mm through-hole on a surface with a diameter of 16.5 mm, and the mounting region of the element is constrained. Consequently, if mounting of signal processing circuitry other than the piezo-electric element is to be attempted, the diameter of the stem must be enlarged. However, enlargement of the diameter of the stem signifies a decline in resonant frequency even if thickness is the same, and stem thickness must be increased further in order to maintain the resonant frequency at the same value. If this occurs, the size of the through-hole must also be enlarged proportionately to the stem thickness as described above, repeating a vicious cycle and generating a failure in which design values are not obtained. Consequently, in a case whereby a piezoelectric element is employed in a vibration detector thereof, the limit for the maximum detection frequency that can be obtained is 10 kHz. In addition, even hypothetically if designed with a large through-hole, the process becomes complex because of the device needed to make the through-hole.

Consequently, in order to enable detection up to high frequencies, it is necessary to use an article lighter than a piezoelectric element. As shown in FIG. 21, even when stem thickness is approximately 3.5 mm, a load allowing the resonant frequency of the stem to be established at 40 kHz is roughly 1 g. If stem thickness is approximately 3.5 mm, formation of a through-hole also becomes possible without major change.

Additionally, even if the fixing pedestal is not a metal stem, ultimately the resonant frequency resonant frequency of the fixing pedestal will undoubtedly decline and exert an influence on vibration detection.

Accordingly, the present inventors gave attention to a semiconductor acceleration sensor formed on a semiconductor substrate used in an airbag and the like as allowing the vibration detector to be made to be 1 g or less. This is structured from a weight (mass), a beam supporting this weight (mass), and a frame to which the beam is fixed by means of etching or the like on for example a semiconductor silicon substrate. The weight (mass) vibrates by means of vibration of an external portion, and vibration is detected by sensing stress generated in the beam by means of vibration thereof; the inventor as well has shipped multiple examples to market. Accordingly, a vibration detector according to this semiconductor is extremely compact with good sensitivity, and thickness thereof can adequately be made to be 1 g or less.

SUMMARY OF THE INVENTION

Consequently, a knock sensor according to the present invention comprises a sensing element wherein a weight (mass) and a beam to support the weight mass as well as to sense vibration are formed on a semiconductor substrate, a fixing pedestal to fix the sensing element and also the strength of which is as hard as metal, a connector portion disposed on a surface side of the fixing pedestal opposite that whereon the sensing element is installed and also conveying output of the sensing element to an external portion, and a housing disposed so as to cover the sensing element as well as being installed on an engine.

According to the foregoing structure, in the present invention a sensing element formed on a semiconductor substrate is taken as a vibration detector, and so the weight thereof can be reduced to an extreme degree. Consequently, as a knock sensor disposing the vibration detector within a space formed by the fixing pedestal and the housing, a knock sensor capable of detection up to a high-frequency region without causing required sensitivity to decline and moreover capable of detecting a plurality of knock signals can be provided.

BRIEF DESCRIPTION OF THE DRAWINGS

FIG. 9(a), FIG. 9(b), FIG. 10(a), FIG. 10(b), FIG. 11(a), and FIG. 11(b) are graphs each showing a relationship between beam thickness, resonant frequency, and sensitivity in a case whereby respective beam lengths are fixed at certain values in a vibration detector of doubly supported beam structure, wherein: FIG. 9(a) is when beam length is taken to be 0.05 mm; FIG. 9(b) is when beam length is taken to be 0.10 mm; FIG. 10(a) is when beam length is taken to be 0.20 mm; FIG. 10(b) is when beam length is taken to be 0.25 mm; FIG. 11(a) is when beam length is taken to be 0.30 mm; and FIG. 11(b) is when beam length is taken to be 0.35 mm.

BEST MODE FOR CARRYING OUT THE INVENTION

A first embodiment of a knock sensor according to the present invention will be described hereinafter with reference to the drawings.

A first embodiment of knock sensor structure will be described first.

Figure 1:
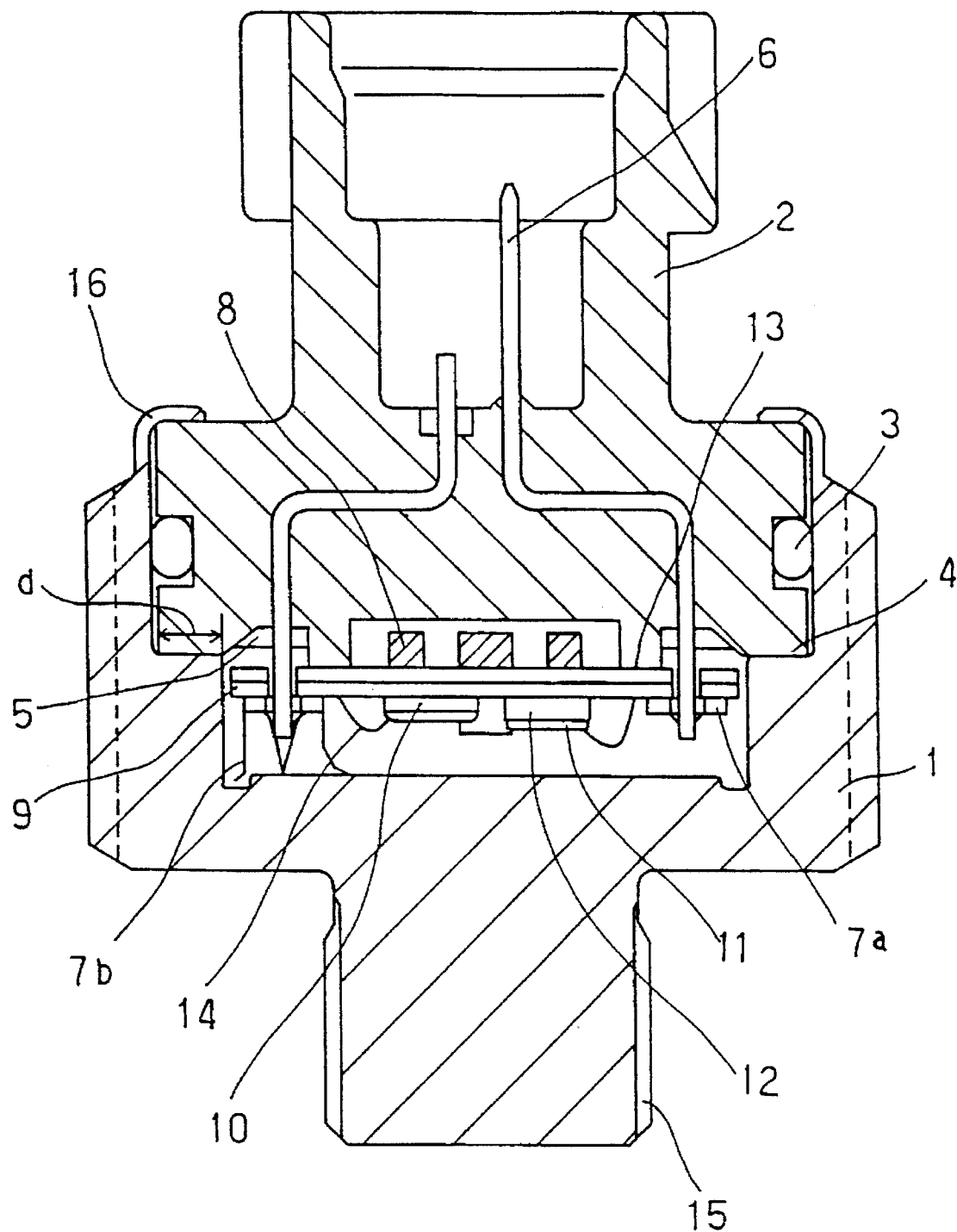
FIG. 1 is a sectional view of a knock sensor showing a first embodiment.

FIG. 1 is a sectional view of a knock sensor. A substrate 9 is glued to a connector 2 formed integrally with a terminal 6 by means of adhesive 13. A fixing pedestal 9 is composed of a ceramic substrate which is stronger than metal, and a capacitor (layer capacitor) and filter 8 forming an EMI filter are built-in or surface-mounted within this. Additionally, a sensing element 11 composed of a semiconductor which will be described below and a signal processor 10 composed of a power supply circuit, amplifier circuit, and knock signal discriminator circuit are glued to the fixing pedestal 9, with electrical conductance between elements or with an external portion provided by a wire 14. In addition, the fixing pedestal 9 and connector 2 are electrically bonded by means of a socket 7a, 7b established on the fixing pedestal 9. Accordingly, a housing 1 composed of metal is fixed to the connector 2 by means of caulking 16 and adhesive 4 so as to cover the fixing pedestal 9. Additionally, the fixing pedestal 9 is sealed airtightly by means of an O-ring 3 and adhesive 5. This knock sensor is fixed to an engine for detection of knocking phenomenon by means of a screw 15 of the housing 1.

In order to enable the combined weight of the sensing element 11 to be described below and signal processor circuit and the like to be made to be approximately 0.1 g, a knock sensor structured in the foregoing manner can maintain the resonant frequency of the substrate at approximately 40 kHz even when connected to the connector side via the fixing pedestal 9. Consequently, even if the sensing element is installed on the connector side via the fixing pedestal, a sensor capable of detecting up to a high-frequency region of approximately 15 kHz or more can be provided. Additionally, in comparison with a case whereby a sensing element is installed on the housing side, according to the present structure the fixing pedestal substrate on which the sensing element is priorly mounted can be installed on the connector side, and so the fabrication process is simplified and connection of the connector terminal and substrate connected done easily and reliably.

However, in a knock sensor according to the present embodiment, the maximum frequency to detect is roughly 15 kHz or more which is high, and if the resonant frequency of the connector is considered, there exists limitations in structure which satisfy performance. According to the present structure, compactness and light weight of the mounted device are attempted by employing a sensing element composed of a semiconductor for the vibration detector instead of employing a conventional piezoelectric element, and along with this, the foregoing structure was achieved by optimizing the composition and configuration of the connector as well as Young's modulus of the adhesive fixing the connector and housing. This optimization was analyzed by means of FEM. As a result of this, the Young's modulus of the composition of the connector was 1,000 kgf/mm$^2$ to 2,000 kgf/mm$^2$, the adhesive portion connector thickness d indicated in FIG. 1 was 1 to 3 mm, and the adhesive Young's modulus was 10 to 2,000 kgf/mm$^2$, by means of which the present structure was established.

Figure 2:
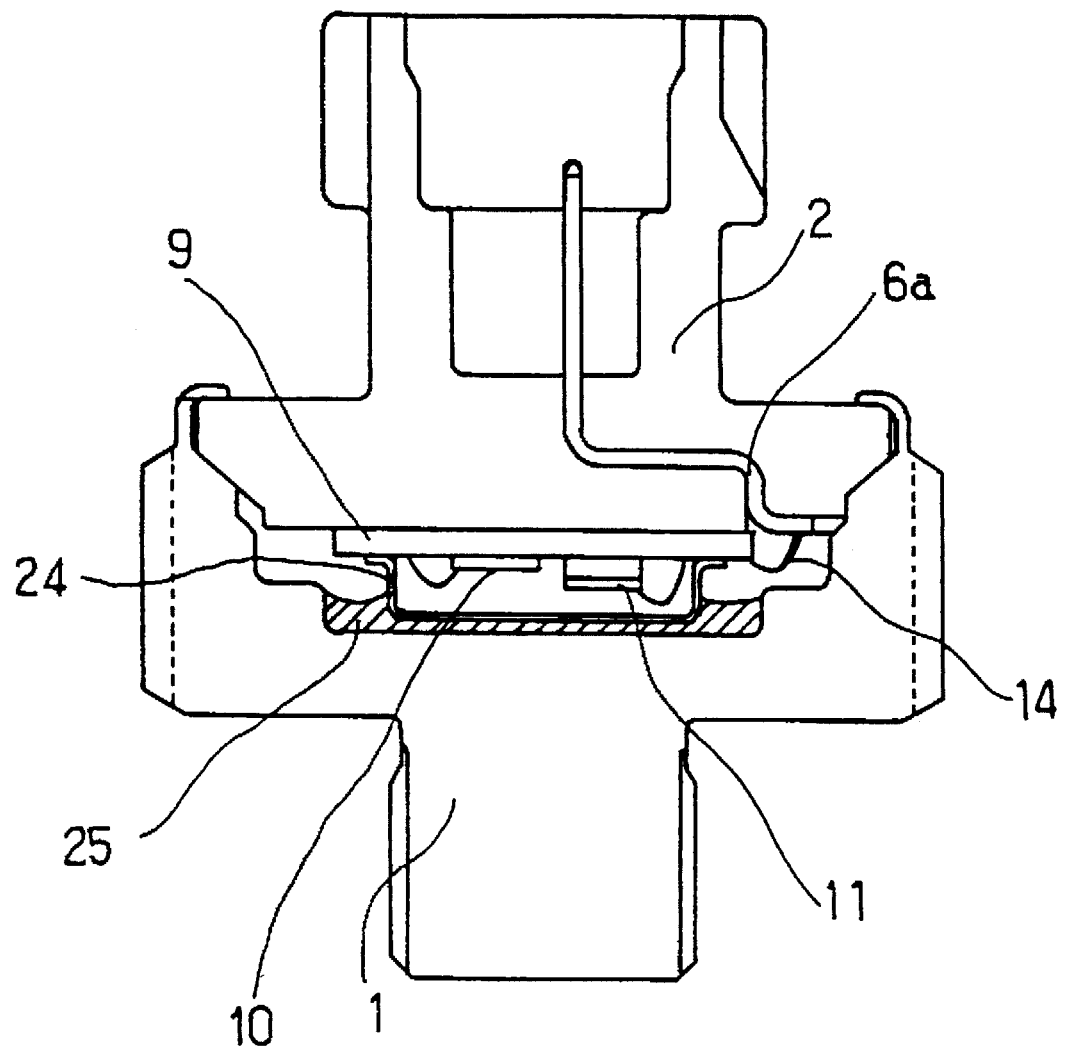
FIG. 2 is a sectional view of a knock sensor showing a second embodiment.

Next, FIG. 2 indicates a modification of the first embodiment as a second embodiment. This is fixed to the connector 2 by means of adhesive or the like on the entirety of the rear surface of the fixing pedestal 9. Accordingly, a connector terminal 6a is connected to the sensing element 11 or a signal processing circuit 10 or the like by means of a wire bond 14. The signal processing circuit 11 and sensing element 10 according to the present embodiment are sealed by means of a can 24 and simultaneously the can 24 is caused to contact silicone gel 25 injection-hardened within the housing 1. By doing this, vibration of the connector 2 conveyed via the fixing pedestal 9 can be absorbed by the silicone gel 25 via the can 24, and resonance of the fixing pedestal 9 can be suppressed. Consequently, resonance of the connector is not conveyed directly to the sensing element. Accordingly, the degree of design freedom of the vibration countermeasures thereof is increased in comparison with the first embodiment.

Figure 3A:
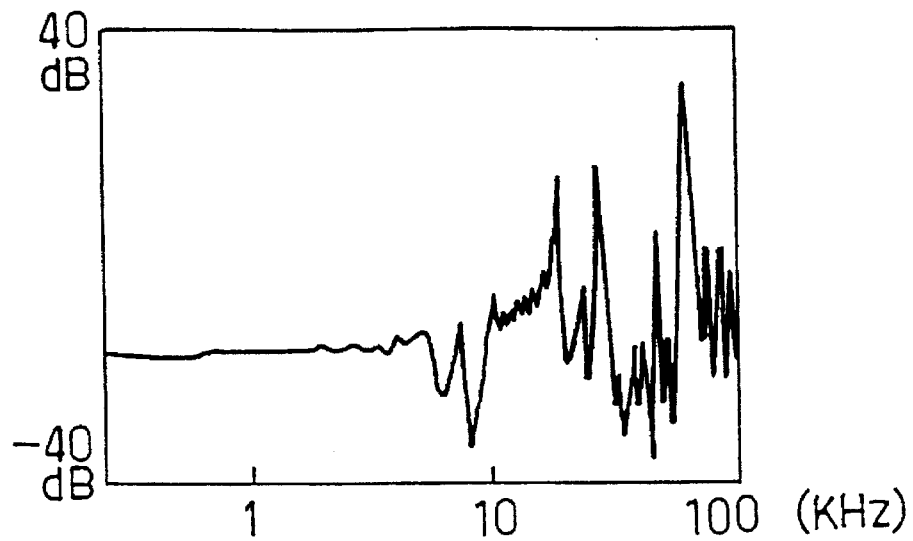
FIGS. 3(a) and 3(b) are characteristic diagrams for the purpose of indicating effects of the second embodiment.
Figure 3B:
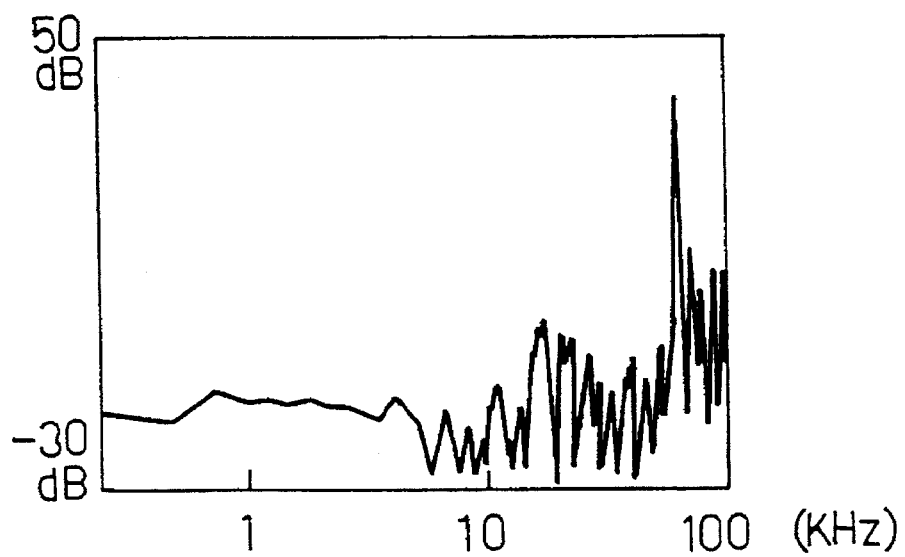

Vibration suppression of the fixing pedestal 9 by means of the silicone gel 25 is indicated in FIGS. 3(a) and 3(b). FIG. 3(a) shows a state with no silicone gel, and FIG. 3(b) shows a state with silicone gel. In the fixing pedestal 9 of the sensor with no silicone gel there is considerable fabrication at the frequency bands of 20 kHz, 30 kHz, and 50 kHz, but it is understood that in the fixing pedestal 9 of the sensor with silicone gel, vibration is suppressed at the foregoing singularity points. Moreover, the material to absorb vibration is not exclusively silicone gel in particular. Additionally, it is also acceptable for the terminal 6a to be a structure penetrating the fixing pedestal 9.

Figure 4:
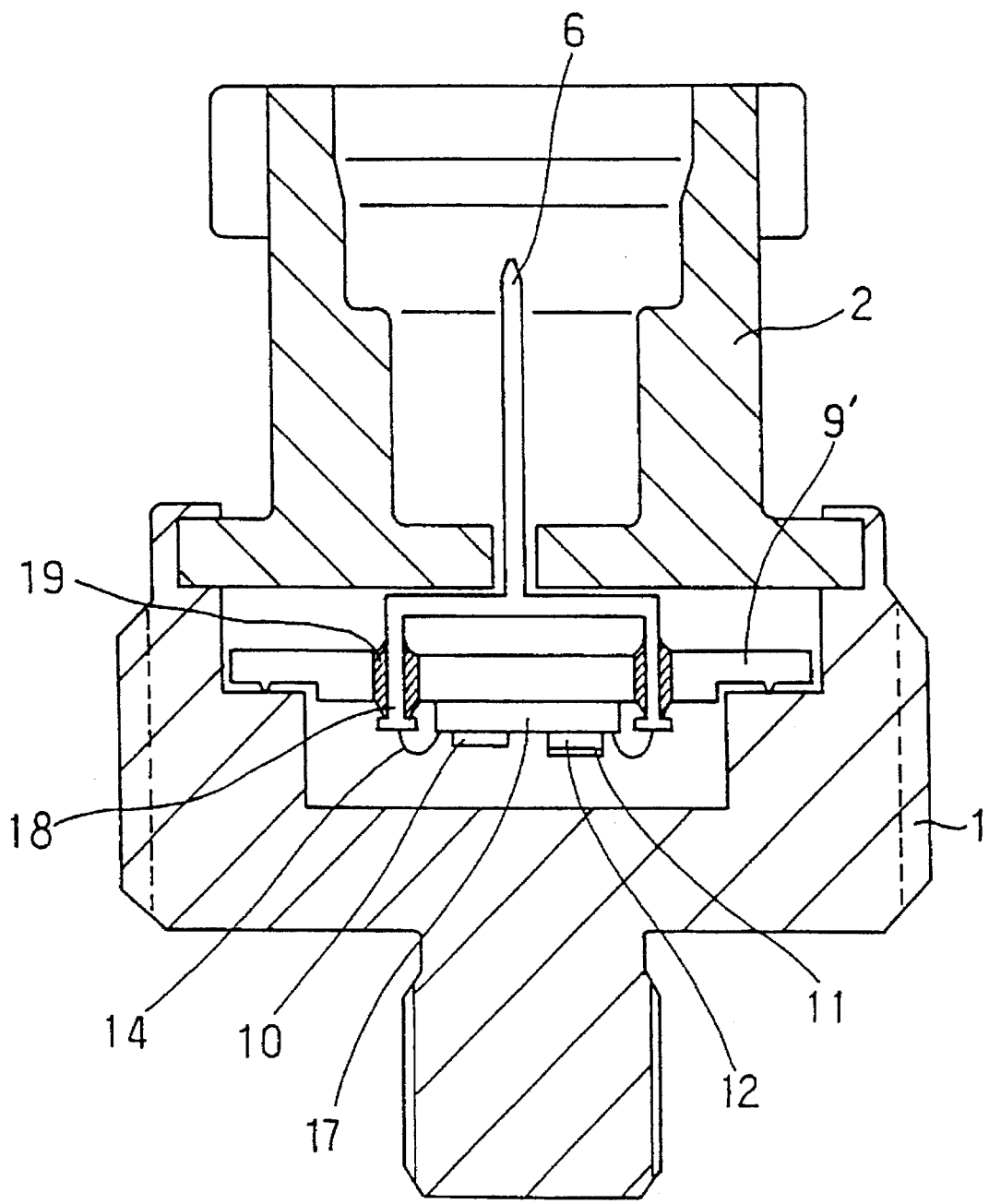
FIG. 4 is a sectional view of a knock sensor showing a third embodiment.

Next, as a third embodiment, FIG. 4 indicates a device employing hermetic seal technology as a method to seal a sensing element composed of a semiconductor.

Figure 19:
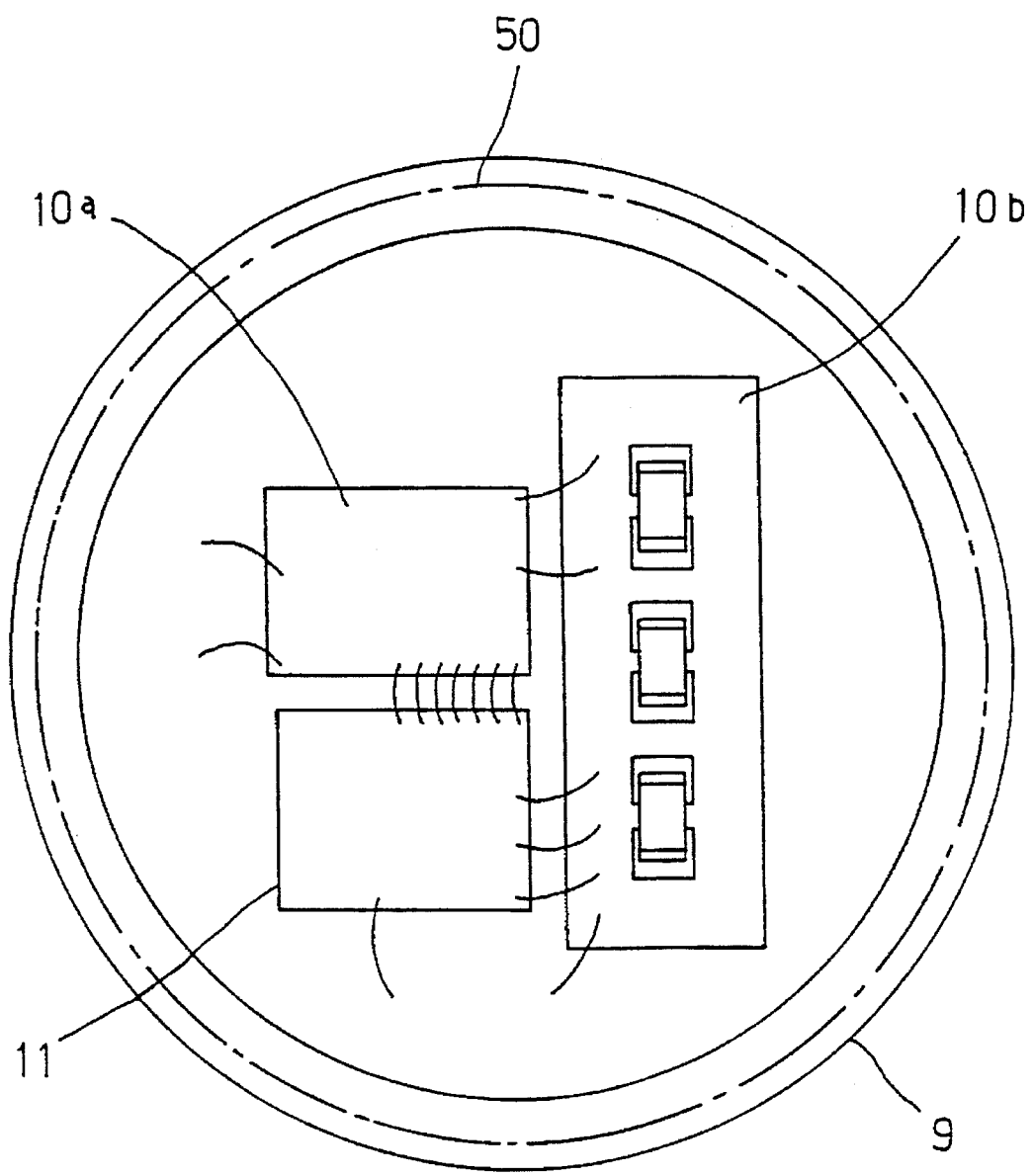
FIG. 19 is a view showing a state mounted with an element fixed on a fixing pedestal.
Figure 20:
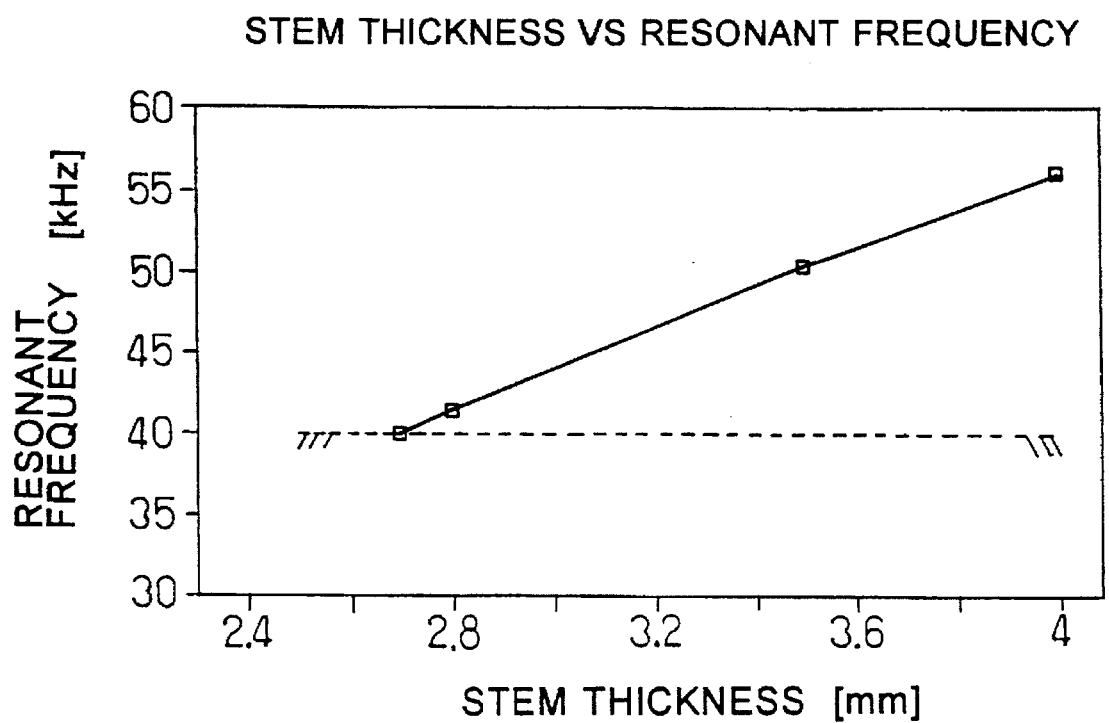
FIG. 20 is a graph showing a relationship between stem thickness and resonant frequency.
Figure 21:
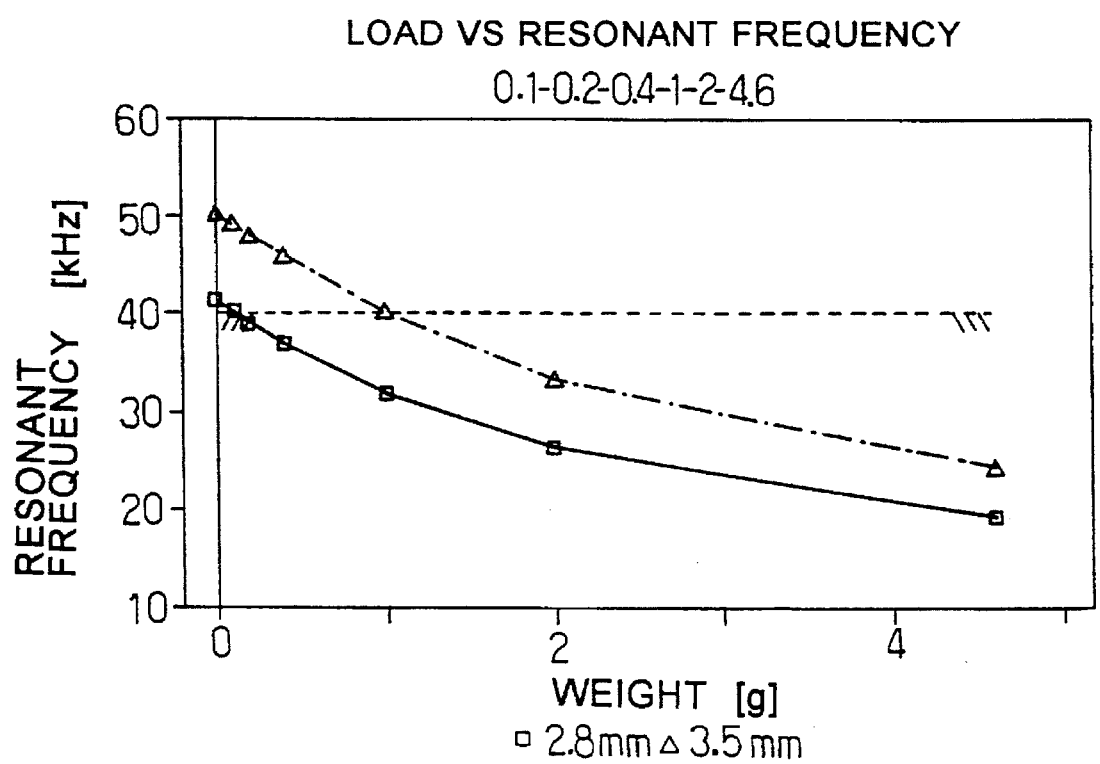
FIG. 21 is a graph showing a relationship between load region and resonant frequency.
Figure 22:
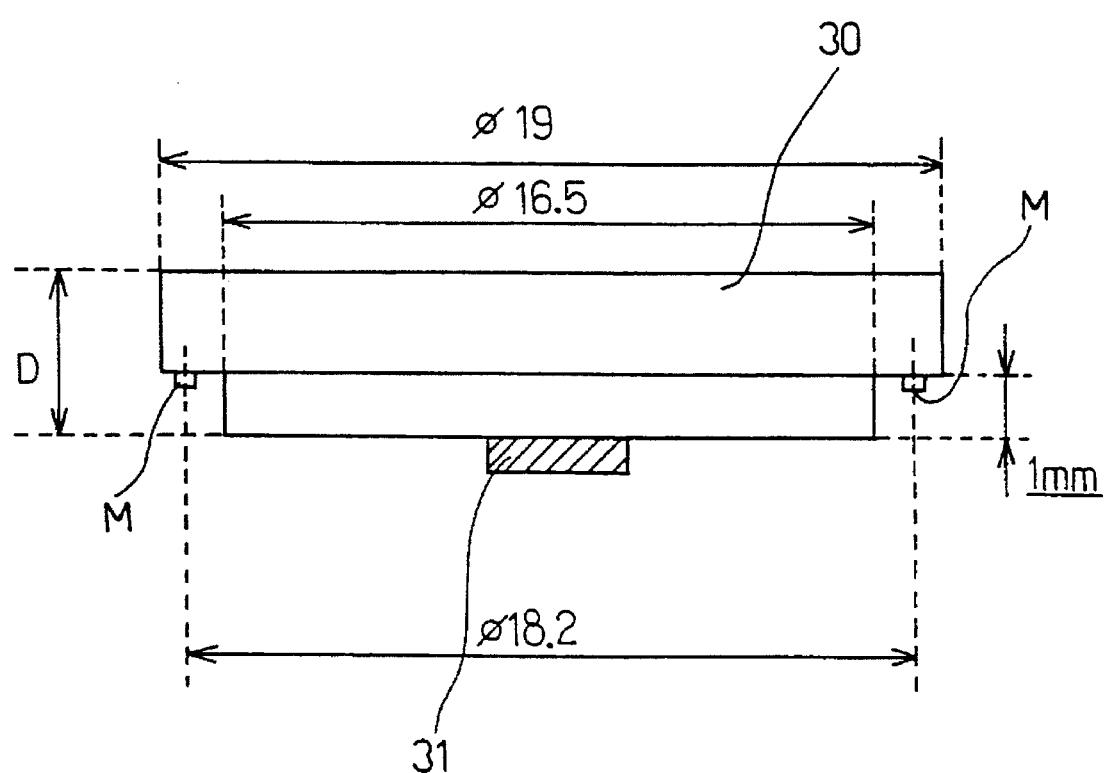
FIG. 22 is a view showing a model obtaining the characteristic diagrams of FIG. 20 and FIG. 21.

In this case, a sensing element 11 and signal processor 10 are fixed via a substrate 17 to a metal stem 9', which becomes a fixing pedestal, and moreover are fixed by welding to a housing 1. The structure of the metal stem 9' at this time has a thickness of 2.8 mm and a diameter of 19 mm, as shown in FIG. 21, and the diameter of the surface whereon the sensing element and so on are mounted is 16.5 mm, and the diameter of the through-hole passed through by an extraction pin 18 is approximately 2.8 mm. According to this embodiment, the sensing element 11 and signal processor 10 are mounted on the metal stem 9' via the substrate 17, but the overall weight of the mounted components becomes roughly 0.3 g. Additionally, as will be described later it is acceptable for this substrate 17 to be absent as shown in FIG. 19.

In this manner, according to the present embodiment a vibration detector composed of a semiconductor is employed as the sensing element, similarly to the first embodiment, and so sensitivity is favorable with compactness, the weight thereof can be made to be an extremely light approximately 0.3 g, and even when mounted on a thin metal stem in the above-described manner, the resonant frequency of the metal stem can be caused to be 40 kHz with substantially no decline. Additionally, the thickness of the metal stem is approximately 2.8 mm, and the through-hole through which the extraction pin passes becomes easily formable. Consequently, a knock sensor of a structure whereby the fabrication process is simplified, and furthermore which can detect up to high-frequency regions with no drop in sensitivity, can be provided.

Additionally, in comparison with the structure of the first embodiment there is no particular need to perform vibration countermeasures in the composition of the connector or the like. By means of this, the selection range is further expanded for the composition of the connector 2 and the composition of the adhesive. In addition, the sensing element 11 and signal processor 10 are reliably sealed airtightly by means of projection welding and glass sealing of the extraction pin 18.

Moreover, the foregoing third embodiment adopts an airtight-seal structure which employs hermetic seal technology to fix the extraction pin, but it is also acceptable for example to fix the extraction pin by means of filler-containing adhesive or the like instead of hermetic seal glass material, so as to seal airtightly. Alternatively, it is also acceptable to adopt an airtightly sealed structure whereby a member other than glass is inserted into the through-hole.

Furthermore, according to the foregoing first through third embodiments, by means of achieving compactness of the sensing portion to detect vibration, it becomes possible to dispose an amplifier circuit to amplify the output signal of the sensing element and a discriminator circuit to process the amplified signal and output a knock signal to an external portion on the same substrate without enlarging the diameter of the ceramic substrate which becomes the fixing pedestal or of the metal stem. Effects which this yields will be described hereinafter.

Figure 5:
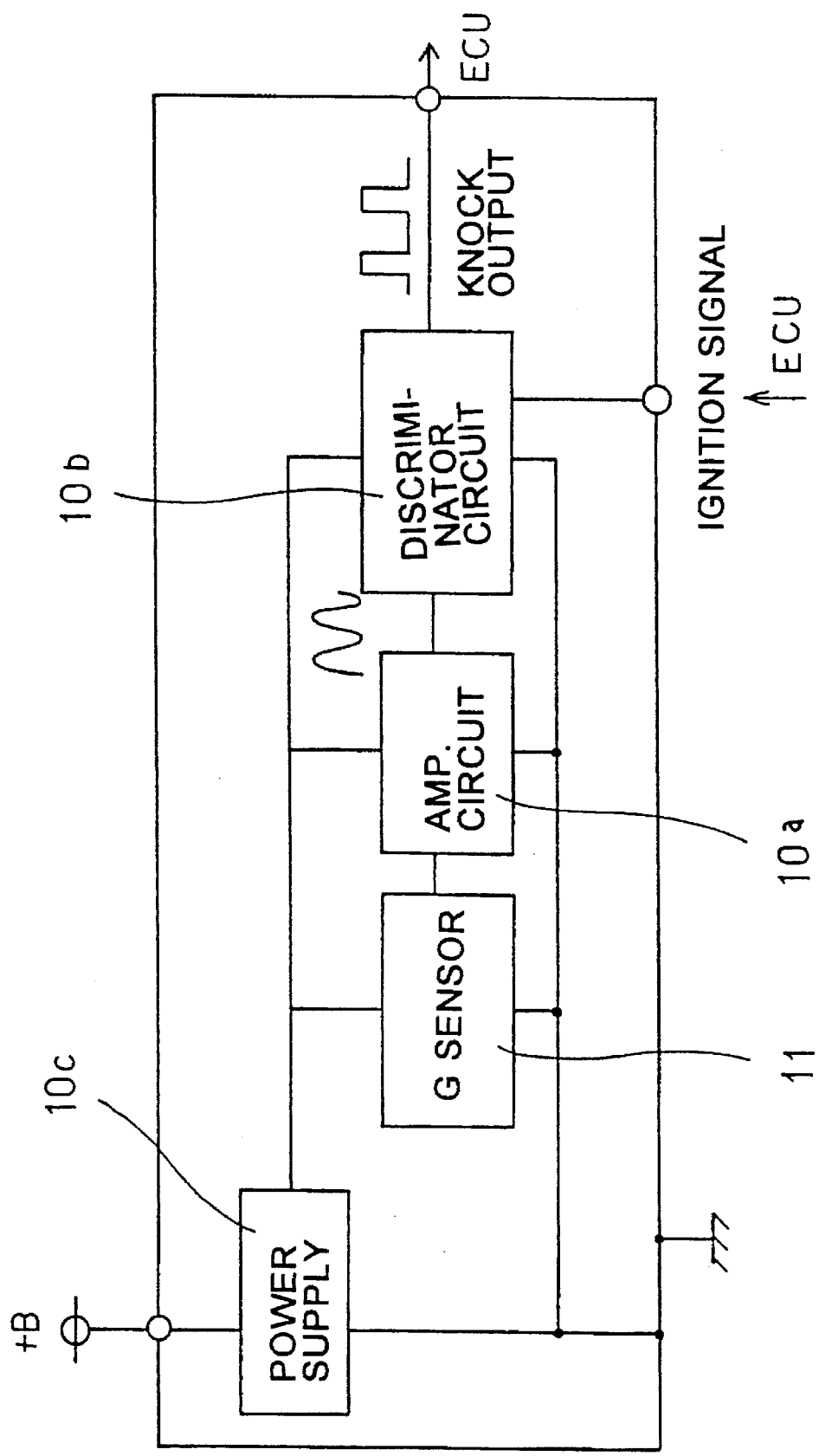
FIG. 5 is a block diagram indicating a signal processing circuit.

Firstly, FIG. 5 indicates a block diagram of a vibration detection circuit of the present structure. A signal detected by means of the sensing element 11 is amplified by an amplifier circuit 10a, synchronized to an ignition signal from an engine ECU and determined to be a knocking phenomenon such as knock signal discriminator circuit 10b, and output to the ECU. Further, 10c is a power supply circuit formed on the same substrate as the amplifier circuit 10a and knock signal discriminator circuit 10b, and supplies electrical power from the battery of the vehicle or the like to the respective circuits. A constant voltage of for example 5 V is caused to be generated as the voltage thereof. Consequently, in a case whereby voltage of the battery is taken to be 12 V, the difference thereof is 7 V, and a stable voltage can be provided to the respective circuits even if battery voltage fluctuates due to noise or the like.

Moreover, as is shown in this drawing, a signal amplified by the amplifier circuit 10a is analog output, but a signal discriminated by the knock signal discriminator circuit is connected to the ECU as digital output. Consequently, a structure which is strong with respect to noise can be achieved as the knock sensor.

By means of this, in a case whereby for example a ground (GND) is taken from the engine (chassis), with respect to when GND potential is subjected to influence from another circuit and fluctuates during analog output and the fluctuation thereof is overlaid on the analog output and is erroneously processed at the next stage of signal processing, with digital output, even if fluctuation in GND potential is overlaid on output, discrimination is made at ½ of the rising-edge height in the next stage of signal processing, and so if the noise is not considerable, the influence of the noise is nor received. Consequently, it becomes possible actually to take the GND from the engine via a socket 7b and the housing, as shown in for example FIG. 1. By means of this, wiring for GND use becomes unnecessary, and reliability is improved, and along with this the need to provide a connector terminal for GND use is eliminated and the connector can be made smaller.

In this manner, a structure with a small and light sensing element is possible and so it becomes possible to mount other circuit elements on the fixing pedestal, by means of which a sensor which is strong with respect to fluctuations of the battery and GND potential fluctuations can be provided.

Next, a sensing element composed of a semiconductor element employed in the present embodiment will be described hereinafter.

Figure 6A:
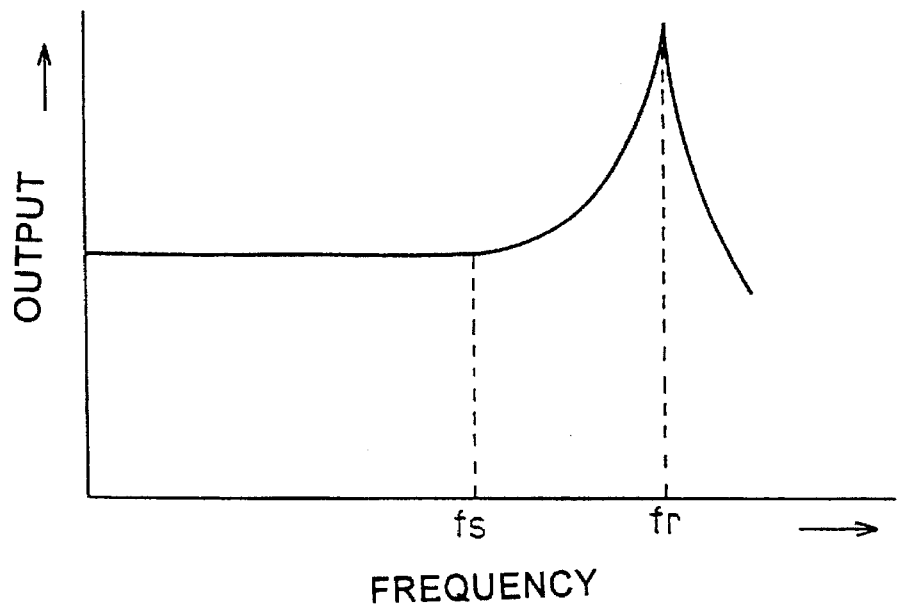
FIG. 6(a) is a graph showing frequency characteristics of a knock sensor.

The present inventors firstly investigated the frequency range wherein the resonant frequency of the sensing element should be established. Here, as shown in FIG. 6(a), in a case whereby the maximum detection frequency was taken to be fs and the resonant frequency was taken to be fr, the resonant frequency fr must be established so that the resonant frequency is not affected, such that the detection region assumes flat characteristics. However, in detecting vibration due to an engine knocking phenomenon, the problem arises as to whether the sensing element composed of a semiconductor which is employed in a semiconductor acceleration sensor can satisfy the basic characteristics of the sensing portion such as sensitivity, resonant frequency, and fracture strength. The weight (mass) configuration and beam configuration, particularly the beam thickness and beam width, are in a close relationship with resonant frequency and sensitivity, and if beam thickness and beam width are caused to be changed, resonant frequency and sensitivity change greatly. If beam width is taken as an example, resonant frequency is proportional to the square root of beam width, and sensitivity is inversely proportional to beam width. That is to say, beam width and resonant frequency can be said to be in a mutually contradictory relationship with beam width and sensitivity. This is indicated respectively by the solid line and the broken line in FIG. 6(b). Consequently, the problem arose as to whether a structure exists which adequately satisfies the basic characteristics of sensitivity and resonant frequency.

In order to obtain stabilized output, the present inventors firstly needed to establish resonant frequency so that sensor output yielded flat characteristics even at maximum detection frequency. As is understood from examination of FIG. 6(a), output increases in the manner of an exponential function from the flat region to the peak of resonant frequency. Consequently, resonant frequency must be established so that the rising edge of the output due to the peak of resonant frequency does not overlap with the maximum detection frequency, such that fluctuation in output at the maximum detection frequency becomes a sufficiently small value. However, this rising edge of the output is extremely difficult to determine by means of theoretical analysis, and does not become clear until an element is actually floorboard and measured. In this manner, it is not easy to design a semiconductor acceleration sensor which becomes a vibration detector of a knock sensor.

Accordingly, the present inventors took and tabulated data from a conventional acceleration sensor, and as a result, sought out a relationship of resonant frequency fr and maximum detection frequency fs wherein the response frequency region of sensor output is constantly flat as will be shown below.

$$f_r \geq A \cdot f_s \quad (2.5 \leq A \leq 4)$$

However, A is a constant determined by means of the support method of the weight (mass). Accordingly, by means of discovering this relationship, it was determined that a knock sensor which can satisfy basic characteristics of vibration detection of sensitivity, resonant frequency, and fracture strength is realizable even when a semiconductor acceleration sensor is employed as a vibration detector thereof.

Accordingly, it is understood that if maximum detection frequency is taken to be 15 kHz, it is acceptable for the resonant frequency of the sensing element to have a value of approximately 40 kHz or more.

Figure 6B:
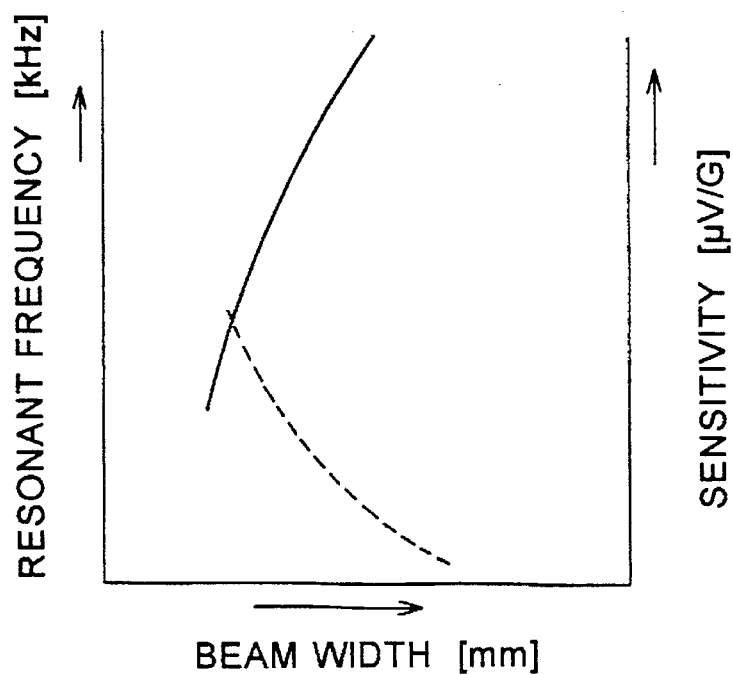
FIG. 6(b) is a graph showing a relationship between beam width, resonant frequency, and sensitivity.
Figure 7A:
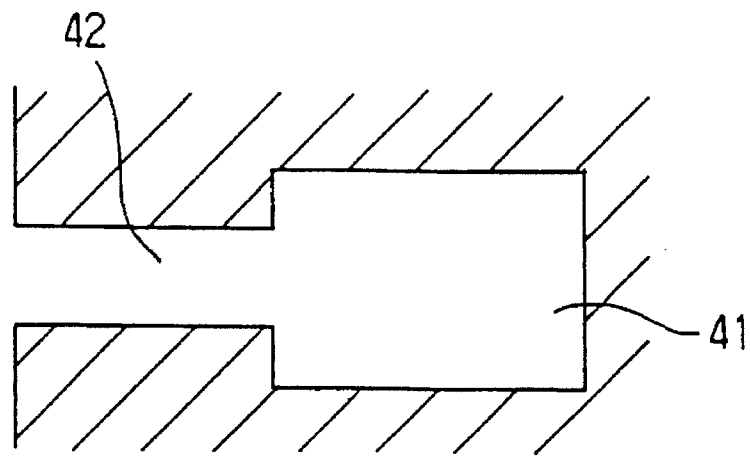
FIG. 7(a) is a view indicating a vibration detector of cantilever supported beam structure.

Next, sensor structure was investigated. As shown in FIG. 6(b), resonant frequency and sensitivity are in a tradeoff relationship in for example beam width, and a sensor structure which simultaneously satisfies the required resonant frequency and sensitivity was investigated. The present inventors investigated the structure indicated in FIGS. 7(a) and 7(b). In the device indicated in FIG. 7(a), a weight (mass) 41 is supported by means of a beam 42. Additionally, FIG. 7(b) indicates a structure wherein a weight (mass) 21 is supported by means of four beams 22. The slanted-line areas in the drawings are portions removed by means of etching. Hereinafter, the device indicated in FIG. 7(a) will be taken to be a cantilever beam structure and the device indicated in FIG. 7(a) will be taken to be a doubly supported beam structure.

Figures 8A, 8B:
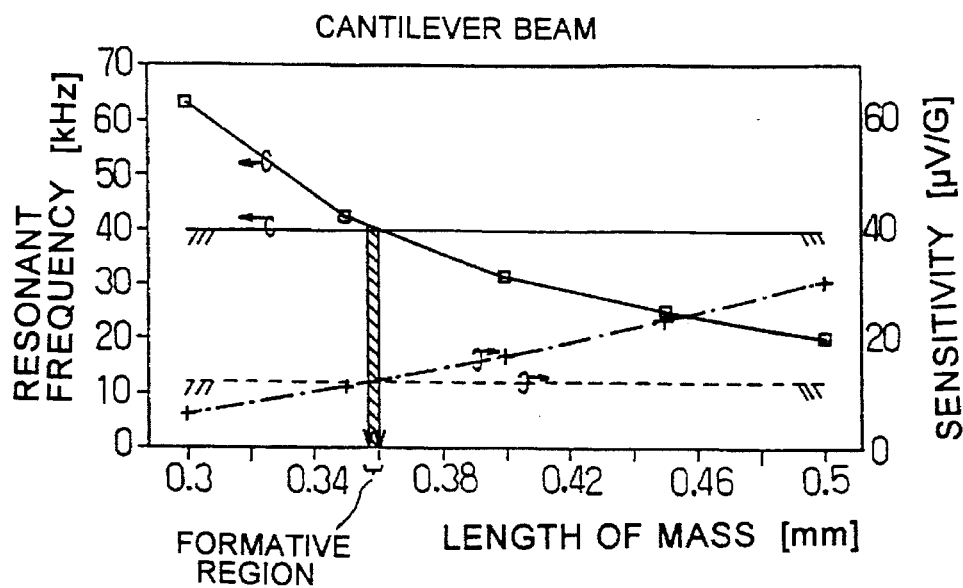
FIG. 8(a) is a graph showing a relationship between sensitivity and resonant frequency of a vibration detector due to length of a weight (mass) of cantilever beam structure.
FIG. 8(b) is a graph showing a relationship between sensitivity and resonant frequency of a vibration detector due to length of a weight (mass) of doubly supported beam structure.
Figure 9A:
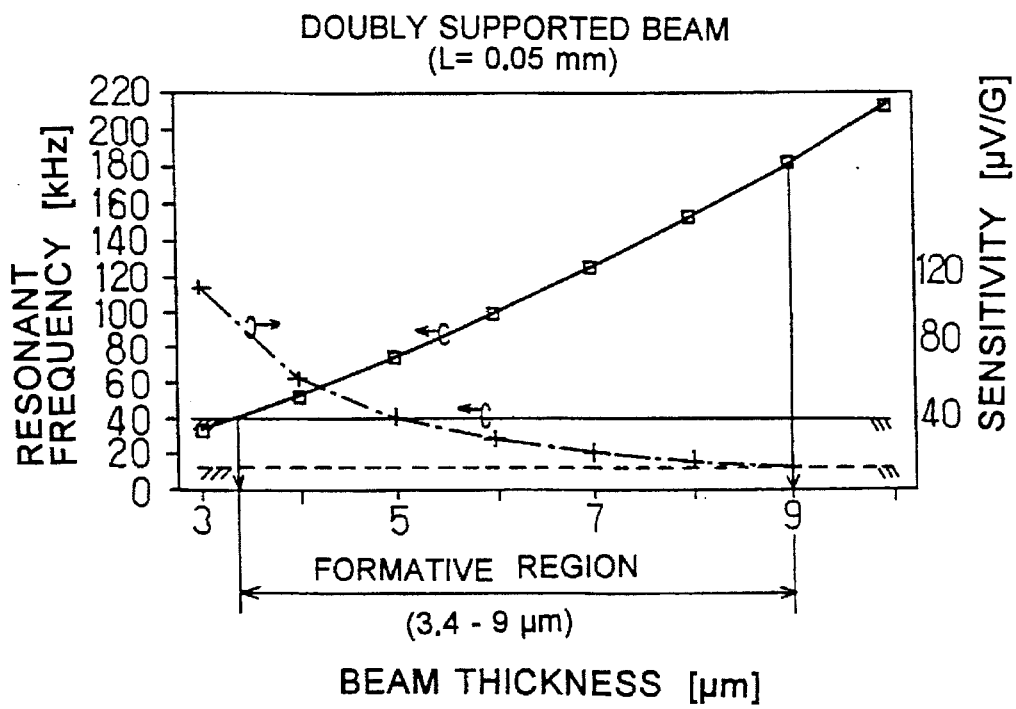
Figure 9B:
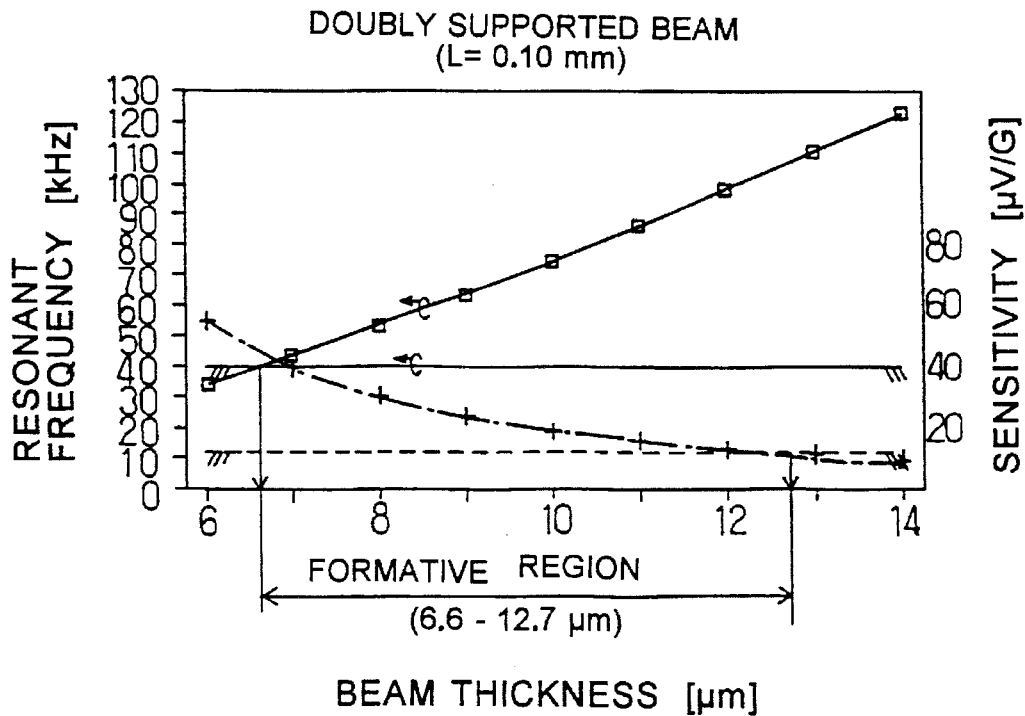
Figure 10A:
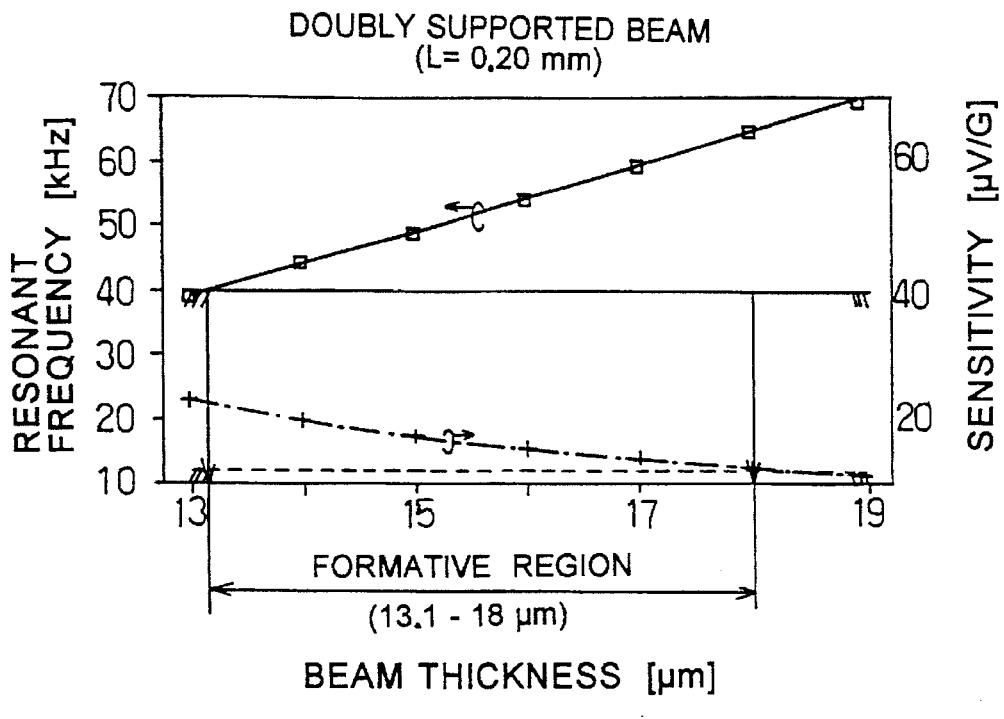
Figure 10B:
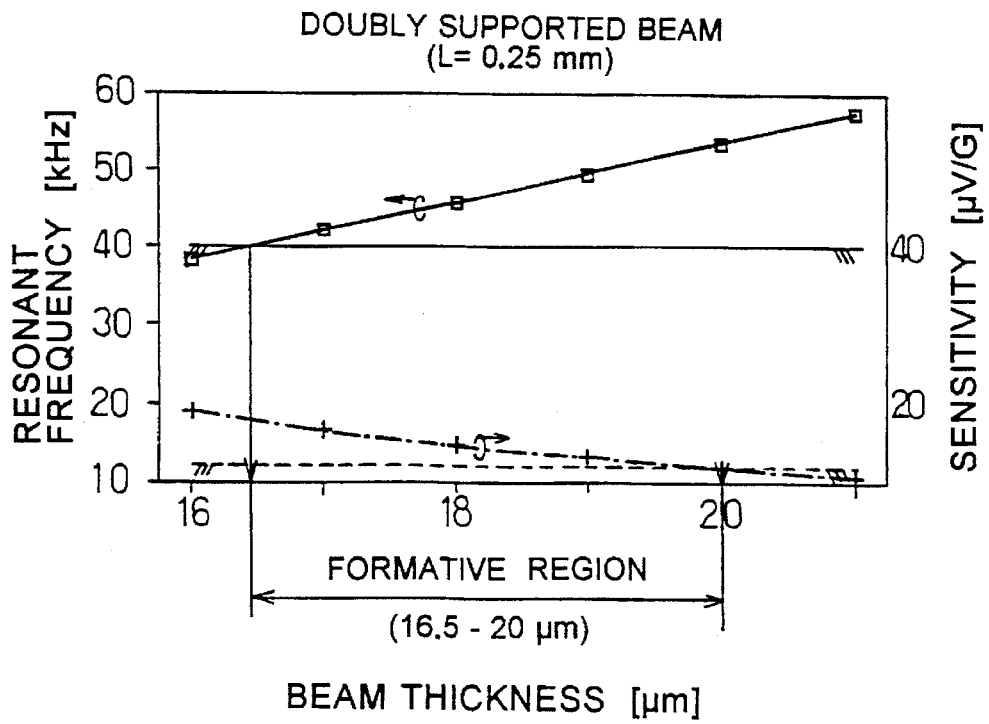
Figure 11A:
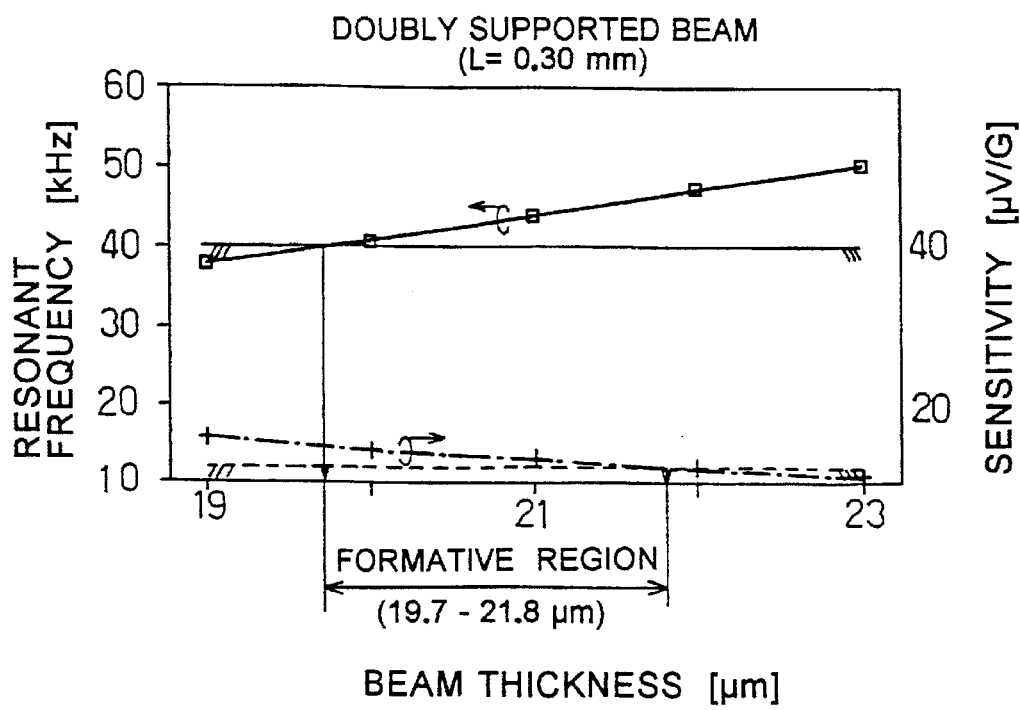
Figure 11B:
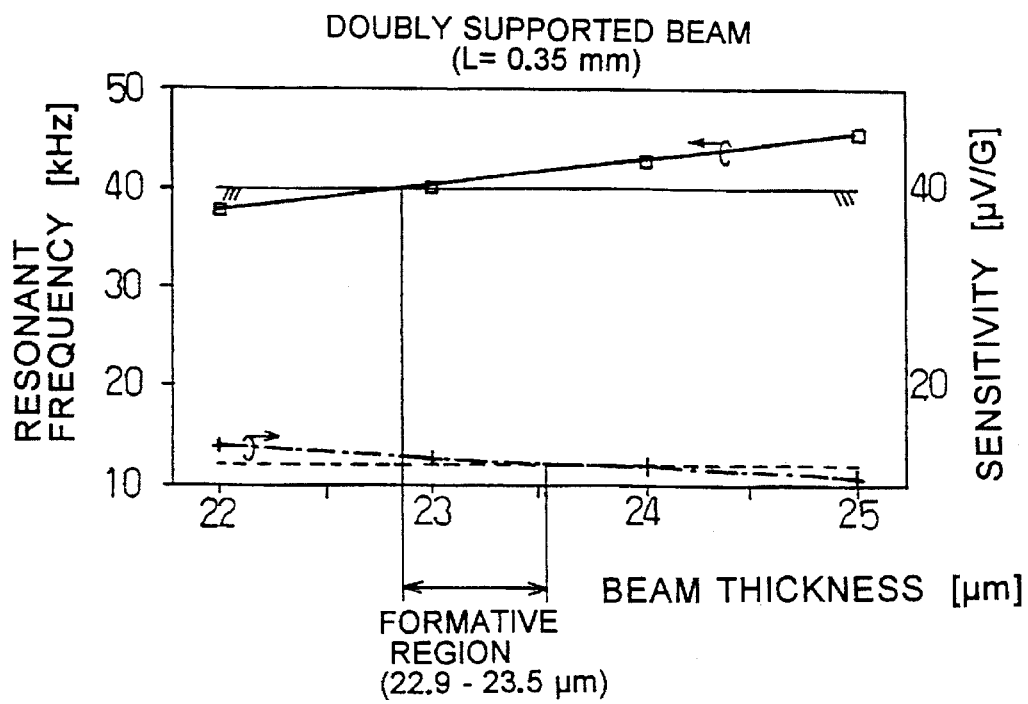

FIGS. 8(a) and 8(b) indicate investigation into whether design solutions taking resonant frequency to be 40 kHz or more and sensitivity to be 12 μV/G or more actually exist for the foregoing cantilever beam structure and doubly supported beam structure. Herein, the horizontal axis is taken to be the length of the weight (mass) 41 or 21, the vertical axis of the left-hand side is taken to be resonant frequency, the vertical axis of the right-hand side is taken to be sensitivity, resonant frequency is indicated by means of a solid line, and sensitivity is indicated by means of a dotted line. According to these two drawings, a design solution for cantilever beam structure exists only in the extremely narrow range wherein the length of the weight (mass) for the purpose of satisfying the above-described conditions is approximately 0.35 to 0.36 mm, and in process it is virtually impossible to align the weight (mass) with this range with good planned yield. In contrast to this, it was understood that with a device of doubly supported beam structure, the length of weight (mass) is approximately 0.6 to 2.7 mm, which is a fabricatable range with sufficiently good planned yield. Consequently, a doubly supported beam structure is fabricatable with good planned yield as a structure which simultaneously satisfies both sensitivity and strength.

Additionally, the length and thickness of the beam were investigated next.

Figure 7B:
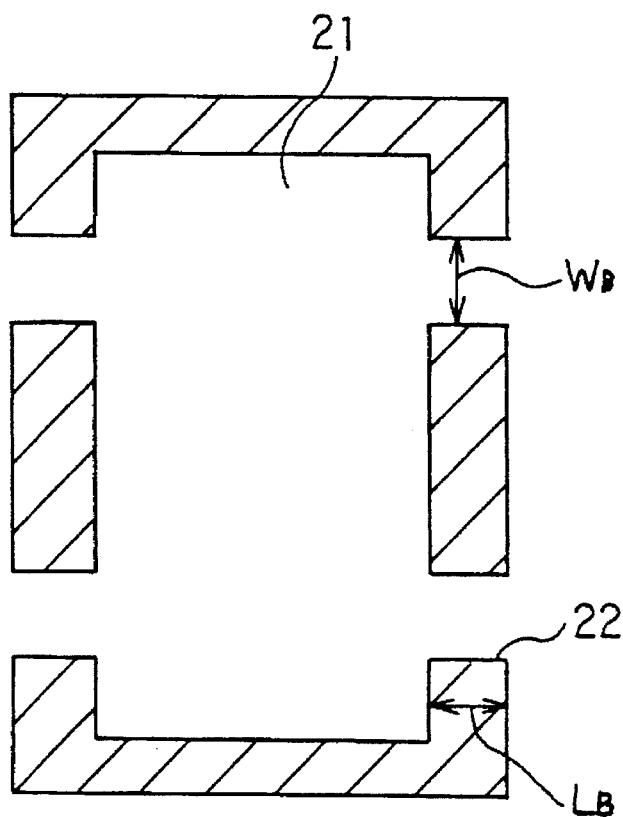
FIG. 7(b) is a view indicating a vibration detector of doubly supported beam structure.

Herein, for the beam width WB indicated in FIG. 7(b), the minimum value becomes essentially 0.13 mm due to the piezoelectric element resistance element formed within the width thereof. Consequently, in a case whereby compactness of the element is attempted, determination is according to the size of the weight (mass) or the length of the beam. For the weight (mass), the surface area of the top surface indicated in FIG. 7(b) becomes roughly 0.9 mm² of 1.2×0.7 due to the machining precision thereof. Additionally, the thickness of the weight (mass) is dependent on the thickness of the machined wafer, and becomes substantially 0.3 mm in the present sample. Consequently, investigation into the length of the beam LB indicated in FIG. 7(b) becomes a critical point in terms of compactness.

Figure 12:
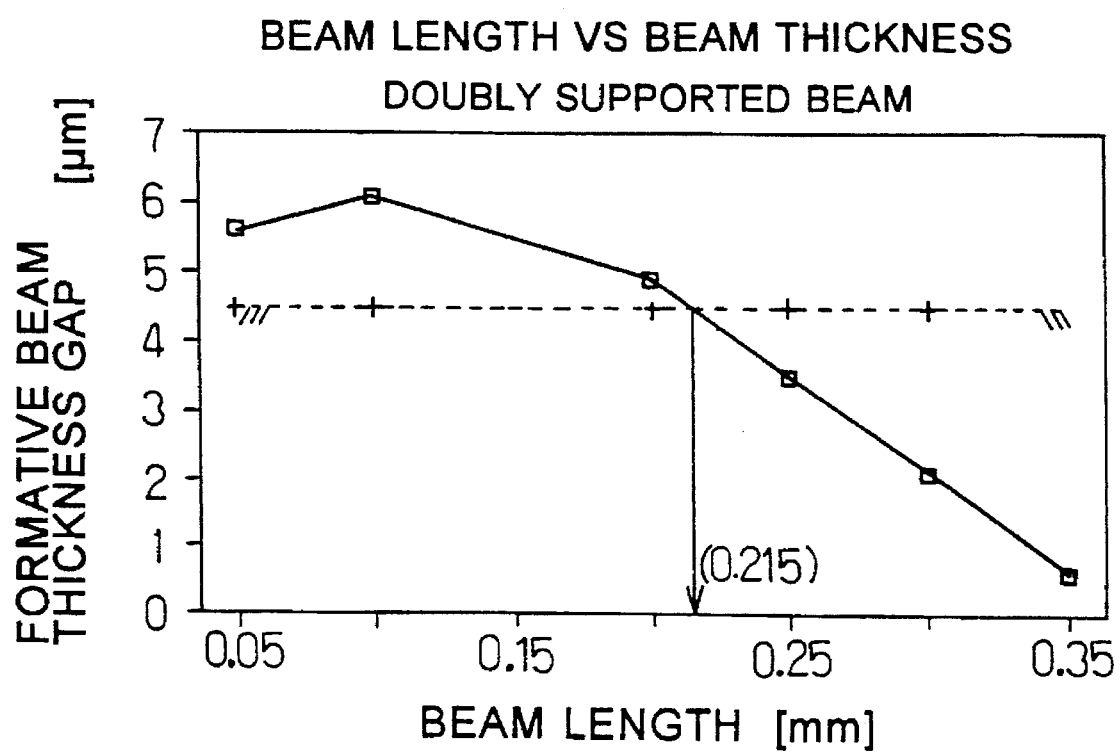
FIG. 12 is a graph showing a formative region of beam width and beam thickness.

In FIGS. 9(a) and 9(b), FIGS. 10(a) and 10(b), and FIGS. 11(a) and 11(b), the formative region of beam width wherein resonant frequency and sensitivity satisfy conditions similar to the foregoing when the length of the beam LB is caused to be varied as a parameter from 0.05 to 0.35 mm was investigated. As a result of this, as shown in FIG. 12, the formative beam thickness interval and beam length obtained on the basis of the above-described conditions are indicated. Herein, because beam thickness is formed by means of wet etching employing an etching liquid, it is extremely difficult to perform etching with precision on the micron order, and there is fluctuation of roughly 4 μm. Consequently, a region from which this 4 μm is subtracted becomes a region wherein beams can be formed with good planned yield. If this is determined according to FIG. 12, beam length becomes 0.05 to 0.215 mm. The lower limit of 0.05 mm indicates the machining limit.

Figure 13:
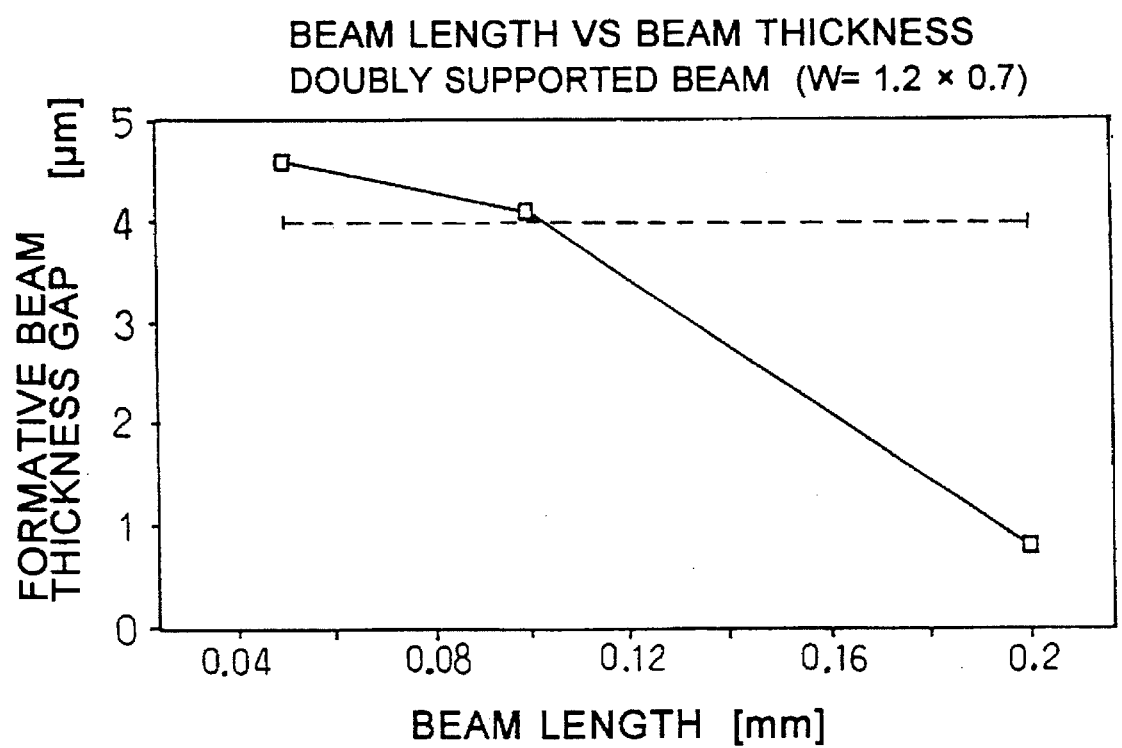
FIG. 13 is a graph showing a formative region of beam width and beam thickness in a case whereby resonant frequency in FIG. 12 is taken to be 60 kHz.

Herein, if for the vibration detector the maximum detection frequency is taken to be 15 kHz, approximately 40 kHz or more is acceptable, and it is sufficient to design according, as was described above, but because the sensing element is a semiconductor and has high crystallinity, Q value during resonance is extremely high. Therefore, if resonance of the fixing pedestal and sensing element become identical, the sensing element causes large vibration when the vibration component of this is added, and the there is possibility of a drop in the signal-to-noise ratio or even destruction. Accordingly, in order to avoid this, the relationship between the formative beam thickness interval described above and beam length was investigated, taking the resonant frequency of the sensing element to be 60 kHz or more. The results of this are indicated in FIG. 13. In a case such as this whereby resonant frequency is taken to be 60 kHz or more and sensitivity is taken to be 12 µV/G or more, the beam length region wherein the formative beam thickness exists becomes approximately 0.05 to 0.1 mm.

Figure 14A:
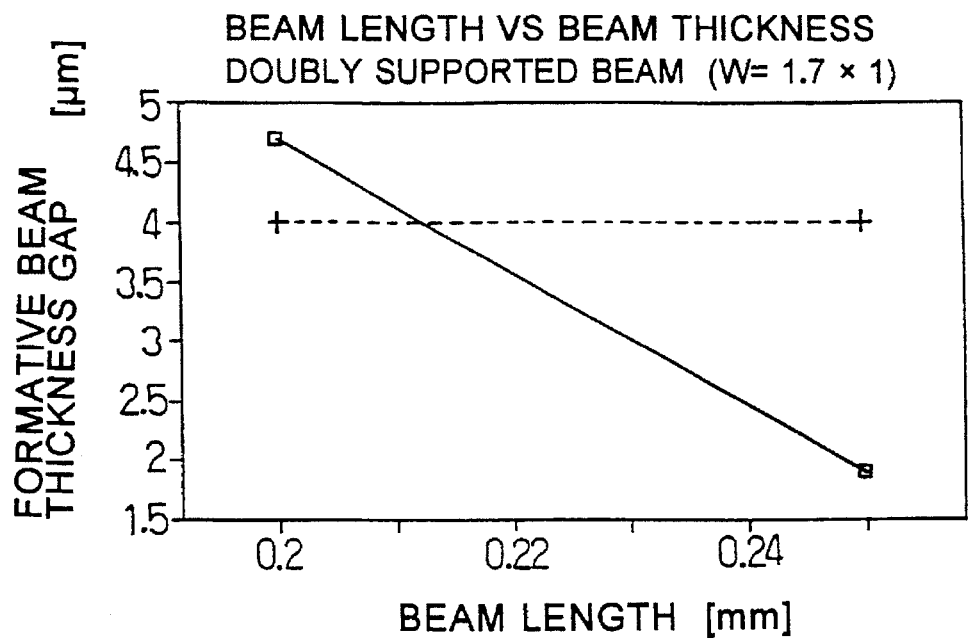
FIG. 14(a) and FIG. 14(b) are graphs each showing a formative region of beam width and beam thickness in a case whereby a weight (mass) has been enlarged.
Figure 14B:
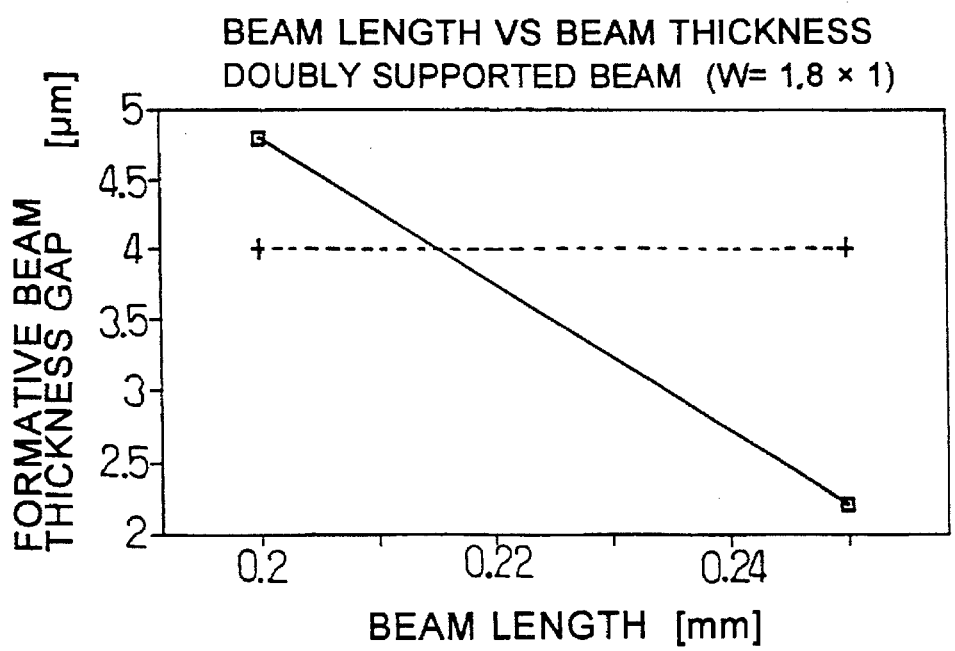

Additionally, the basis of conditions similar to FIG. 13 was determined for a device wherein the size of the weight (mass) is substantially doubled together with taking the resonant frequency to be 60 kHz in consideration of the signal-to-noise ratio and strength as described above. This is data obtained employing the weight (mass) in FIG. 14(a) which is 2.02 times larger than the device for which data was obtained in FIG. 13 and a weight (mass) in FIG. 14(a) which is 2.14 times larger than the device for which data was obtained in FIG. 13. This is a device for which the upper-limit value was investigated, and it is understood from this drawing that the upper-limit value for length of the beam becomes 0.215 mm.

Consequently, in a doubly supported beam structure in a case whereby reduction of the surface area of the weight (mass) and compactness are attempted and moreover consideration is given to minimum conditions (i.e., resonant frequency of 40 kHz or more and sensitivity of 12 µV/G or more) as a knock sensor, in a case even of large size whereby resonant frequency is taken to be 60 kHz or more and the signal-to-noise ratio and strength are considered, beam length becomes 0.05 to 0.215 mm. Furthermore, in a case where size is made compact and the signal-to-noise ratio and strength are considered, a favorable beam length of approximately 0.05 to 0.1 mm is yielded.

Additionally, the considerations which will be described hereinafter are made for a doubly supported beam structure such as that described above.

That is to say, several resonance points exist, not one; primary resonance whereby the weight (mass) resonates perpendicularly and secondary resonance whereby the weight (mass) resonates so as to be twisted are in particular large; when the primary resonant frequency and the secondary resonant frequency are proximate the weight (mass) vibrates complexly, and the beam is destroyed. Consequently, if beam strength is considered, it is demanded that the primary resonant frequency and the secondary resonant frequency be separated.

Figure 15A:
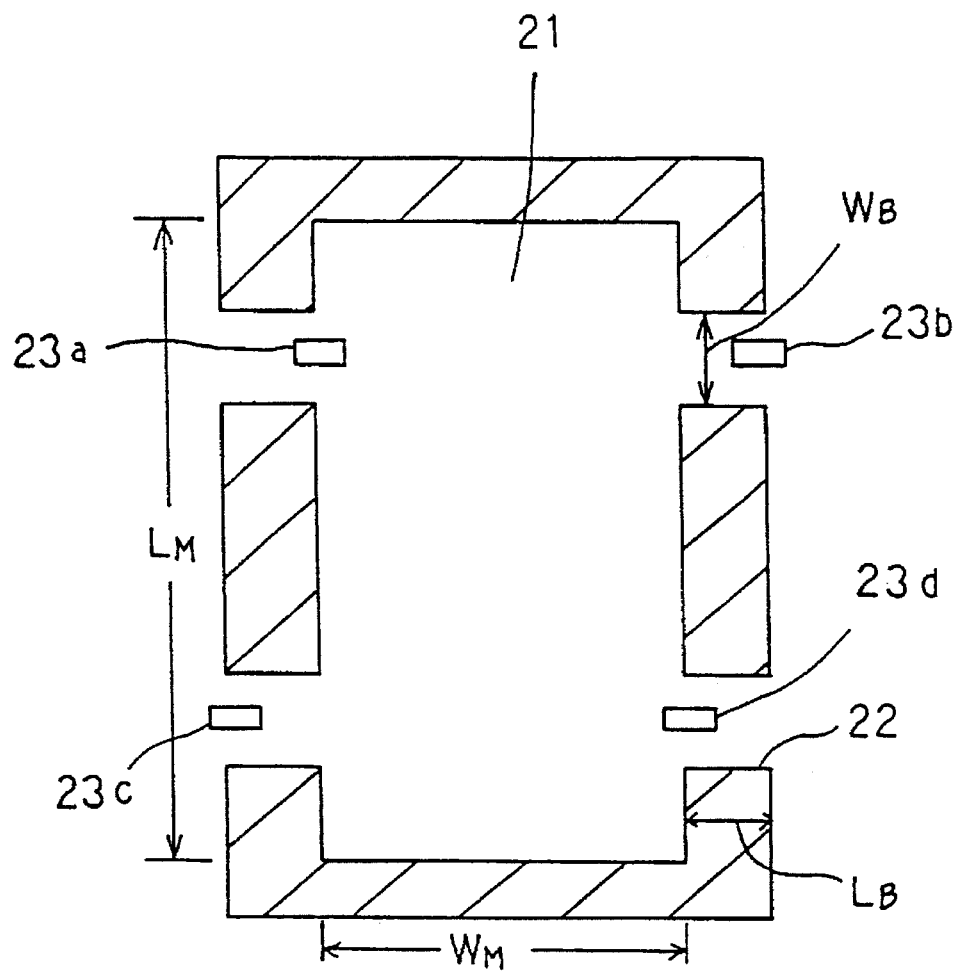
FIG. 15(a) is a structural plane view of a sensing element employed in the foregoing embodiment.
Figure 15B:
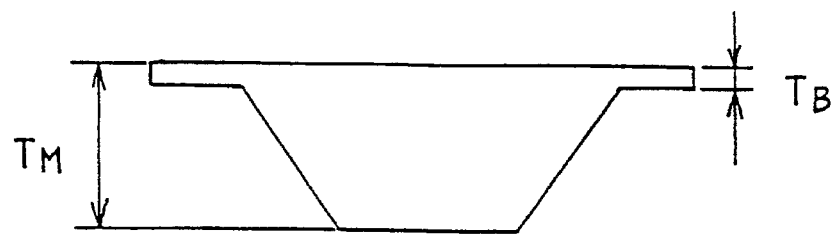
FIG. 15(b) is a sectional view of FIG. 15(a).

From the foregoing, a structure was adopted wherein a weight (mass) 21 of oblong configuration is supported by means of four beams 22 as shown in FIGS. 15(a) and 15(b). According to this structure, generation of torsion is difficult, and so the primary resonant frequency and the secondary resonant frequency can be separated. Additionally, because a Wheatstone bridge circuit can be formed in vibration detection, high sensitivity is obtained.

According to the present embodiment, resonant frequency is established to be 60 kHz or more and sensitivity is established to be 12 µV/G or more, and the beam structure and weight (mass) structure are established as will be described hereinafter. Beam width $W_B$ indicated in FIG. 15(a) becomes 0.13 mm. In addition, beam length LB becomes 0.11 mm. Additionally, because a piezoelectric element is formed on the beam, beam thickness $T_B$ is determined by means of the pn junction thereof, and according to the present embodiment is taken to be 13 µm. Moreover, the thickness of the weight (mass) $T_M$ indicated in FIG. 15(b) is determined by means of the thickness of the wafer utilized, and according to the present embodiment is taken to be 0.3 mm. Furthermore, the width of the weight (mass) $W_M$ is determined by means of the thickness of the weight (mass) $T_M$ because, due to the sensitivity relationship, the etching surface orientation for the purpose of forming the weight (mass) is taken to be a (100) surface and the substrate is caused to be tapered by means of etching. According to the present embodiment, a margin is added and this is taken to be 0.7 mm. Accordingly, the length of the weight (mass) $L_M$ must be established so as to primary Rapid Micro Controller and secondary resonance with this width of the weight (mass) $W_M$ as a basis, and according to the present embodiment is taken to be 1.2 mm.

These values may be established as required, taking the resonant frequency to be established as a basis and giving consideration to the fabrication process, the wafer utilized, the relationship between primary and secondary resonant frequencies, or the like.

A detection method to detect vibration of the weight (mass) will be described next.

Figure 16:
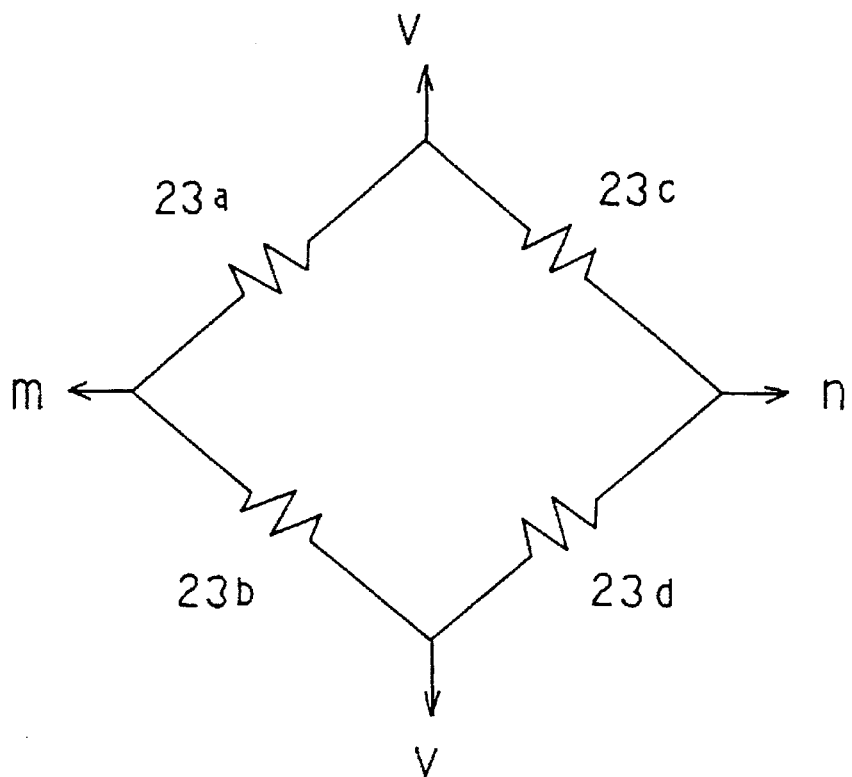
FIG. 16 is a Wheatstone bridge circuit diagram.
Figure 17:
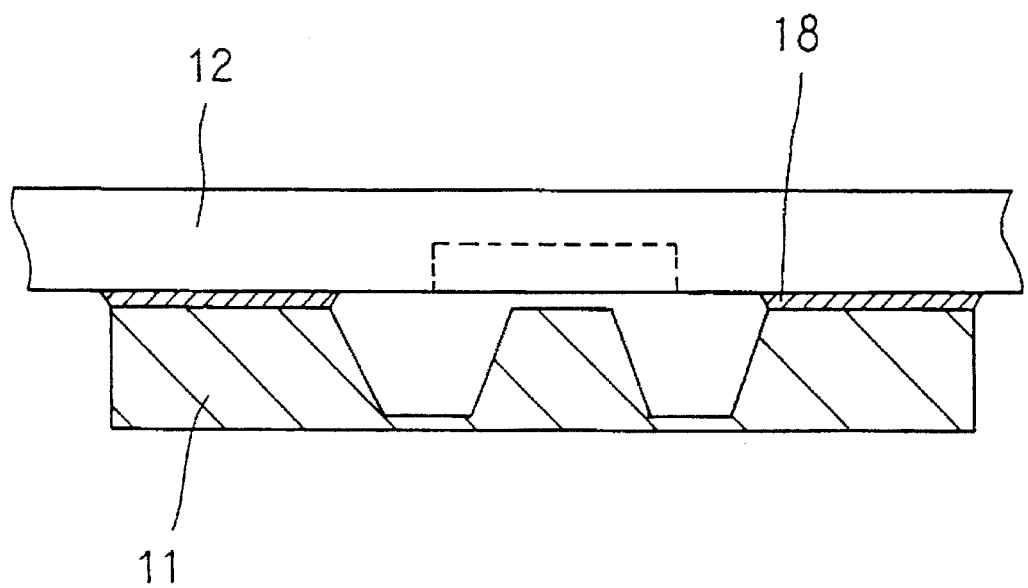
FIG. 17 is a sectional view indicating a sensing element in a state fixed on a substrate.

According to the present embodiment, piezoelectric elements 23a to 23d are disposed as shown in FIG. 15(a). In this manner, disposition is with element 23a and element 23c on the weight (mass) side and element 23b and element 23d on the fixed frame side, and directivity is improved when Wheatstone bridge wiring is performed as shown in FIG. 16. That is to say, in a case whereby the weight (mass) 21 vibrates perpendicularly, the element 23a (element 23c) and the element 23b (element 23d) are subjected to mutually differing stresses, i.e., tensile stress and contraction stress, and sensor sensitivity is improved. Additionally, with respect to torsion vibration (vibration of another axis), the element 23a (element 23c) and the element 23b (element 23d) are subjected to mutually identical stresses, and so the other-axis sensitivity at the Wheatstone bridge of FIG. 16 can be canceled. Furthermore, FIG. 15(b) is a sectional view taken along a line along the beam section of FIG. 15(a). Additionally, the m and n of FIG. 16 are stresses, and V represents the power supply. Furthermore, the number of piezoelectric elements disposed is not exclusively four, and may be for example eight.

In the foregoing manner, a resonant frequency of 60 kHz or more and sensitivity of 12 µV/G or more can be satisfied by designing elements.

Additionally, because the detection frequency of approximately 15 kHz has become considerably high in comparison with several hundred Hz for a conventional acceleration sensor, the beams of the acceleration sensor can be made strong. By means of this, displacement of the weight (mass) 21 in the detection vibration region becomes approximately several µm, and by means of providing this void with the adhesive 18 (thickness approximately 10 µm), the concavity (dotted line portion in the drawing) required in the pedestal for the purpose of installing a conventional acceleration sensor becomes unnecessary. By means of this, the process for the purpose of forming a concavity in the pedestal 12 can be eliminated. Moreover, the void of the pedestal 12 and weight (mass) 21 is the approximately 10 µm thickness of the adhesive 18, which is narrow, and so in a case whereby the weight (mass) 21 vibrates greatly due to a strong shock, the pedestal 12 becomes a vibration stopper for the weight (mass) 21, and destruction of the sensor beams can be prevented.

Additionally, according to the present embodiment a fracture strength of 47,000 to 48,000 G is obtained. This fracture strength becomes a problem in particular in the fabrication process and the transfer process and the like up to installation of the knock sensor, and is a value designed on the basis actual drop testing on concrete and on oak wood, determined with consideration for actual drop shock and resonant frequency of the beams. In a case such as the present of a resonant frequency of 60 kHz, results have been obtained that it is sufficient if there is up to 50,000 G, and so the foregoing value of 47,000 to 48,000 G can be termed substantially sufficient.

Figure 18A:
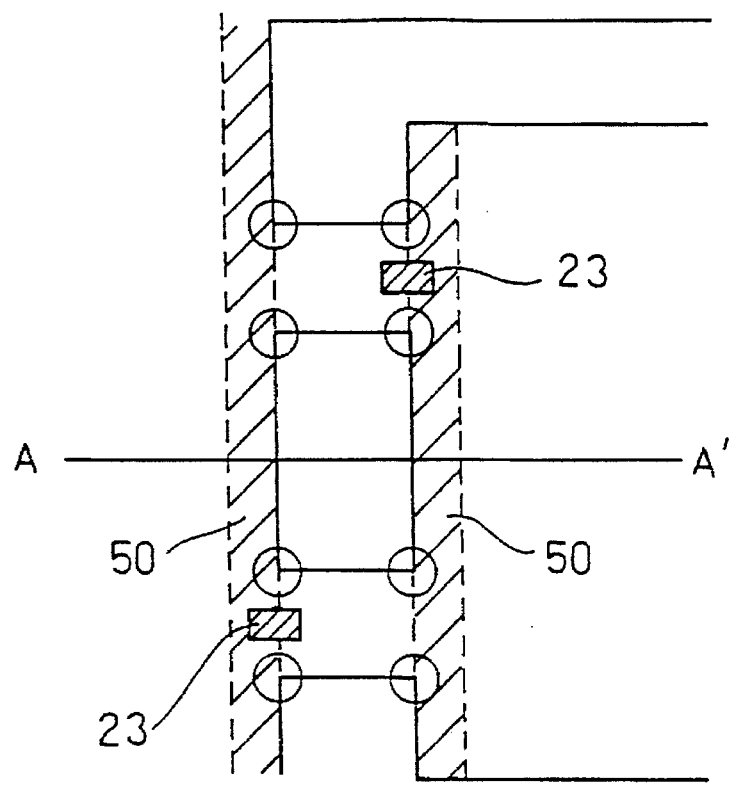
FIG. 18(a) is an enlarged view indicating a portion of a sensing element.
Figure 18B:
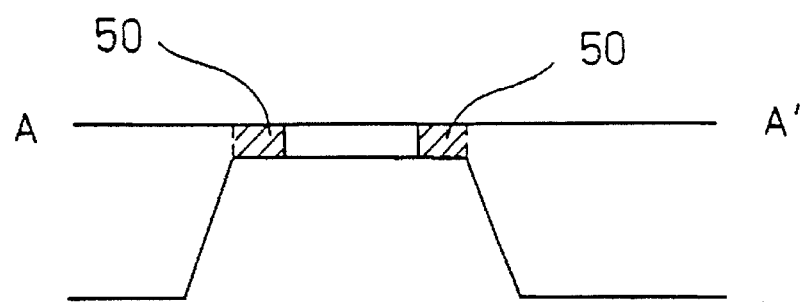
FIG. 18(b) is a sectional view of FIG. 18(a).

Furthermore, if it is desired that this be raised up to 50,000 G, it is acceptable to use a thin film for the beam mounting base portion 50 indicated by dotted lines in FIG. 18(a) and in the sectional view of FIG. 18(b) taken along line A—A' thereof. When done in this manner, the stress concentration of the portions indicated by circles in the drawing can be alleviated, and beam strength can be increased.

Additionally, an influence effect which will be indicated hereinafter is also demonstrated in a case of the structure indicated in FIGS. 18(a) and 18(b).

That is to say, when the weight (mass) has vibrated, it is preferable that the piezoelectric elements be disposed at the mounting base of the weight (mass) and beams which is one fixing point or the mounting base of the beams and frame which is another fixing point, where beam stress is greatest. However, when the elements become small as in the foregoing embodiment, extremely high precision is demanded in the positional alignment of the mask for the purpose of forming the piezoelectric elements. In a case where mask slippage is caused and the piezoelectric elements are shifted from the mounting base of the weight (mass) and beams or the mounting base of the beams and frame, and piezoelectric elements for formed only in the middle of the weight (mass) or only in the middle of the frame without being attached to the beams, the stress sensitivity of the elements thereof declines to an extreme degree. Accordingly, by means of adopting a structure such as in the foregoing FIGS. 18(a) and 18(b), the piezoelectric elements can be formed without fail proximately to maximum stress even if there is a slight amount of mask slippage, and the conventional problem of an inability to detect much stress in a case whereby mask slippage has occurred can be eliminated.

Additionally, according to a knock sensor indicated in the first or third embodiment, wherein a fixing pedestal 9 such as is indicated in FIG. 19 is fixed to the housing or to the connector by means of welding or gluing or the like by means of a fixing portion indicated by 50, because the structure is such that the perimeter of the fixing pedestal 9 is fixed, resonant frequency drops the most when a sensing element 11 and signal processing circuits 10a and 10b and so on are mounted in a center portion thereof. Consequently, if the center of gravity of the foregoing element and signal processing circuits and so on is made not to be placed on the centerpoint of gravity as seen from the fixing portion of the fixing pedestal, decline in resonant frequency can be suppressed to a certain extent. Additionally, as shown in FIG. 4, in a device of a structure wherein a pedestal (substrate 17) further exists between the fixing pedestal 9 and the sensing element and signal processing circuit and the like, it is acceptable if the combined center of gravity of the pedestal thereof and the sensing element and signal processing circuit and the like does not become the centerpoint of gravity seen from the fixing portion. That is to say, it is acceptable if, at the centerpoint of gravity of the fixing pedestal whereat the perimeter portion thereof is fixed, the apparent centerpoint of gravity of the combined weight of elements mounted thereabove does not overlap.

INDUSTRIAL APPLICABILITY

The present invention, as a vibration detection device to detect a knocking phenomenon in an engine mounted in a vehicle or the like, can be applied as a knock sensor while employing a structure wherein a fabrication process is simple and moreover which can detect even up to a high-frequency region with no drop in sensitivity.

What is claimed is:

1. A knock sensor, comprising:
    a housing installed on an engine;
    a connector portion assembled on said housing to form an isolated interior together with said housing, said connector portion including a lead electrically connecting between a side of said interior and side of an exterior of said knock sensor;
    a pedestal disposed within said isolated interior and having a resonant frequency of 40 kHz or more; and
    a sensing means fixed to said pedestal and having a weight of 1 g or less,
    said sensing means including a sensing element which has a frame part, a weight part set in said frame part and apart from said frame part, and a plurality of beam parts connecting said weight part with said frame part to doubly support said weight part within said frame part, wherein said frame part, said weight part and said beam parts are formed of semiconductor substance, and
    said sensing element including a detector detecting a vibration of said weight part responsive to a knocking occurring in said engine,
    wherein each of said beam parts has a geometry selected so as to make a resonant frequency of said sensing element 40 kHz or more to ensure that a maximum detection frequency of said detector is approximately 15 kHz.

2. A knock sensor according to claim 1, wherein said frame part of said sensing element has a square configuration, said weight part has an oblong configuration and is disposed in said frame part to be positioned substantially at a center of said frame part, and said beam parts are connected so as to support said weight part from two opposing side of said frame part and are disposed two by two from one side of said two opposing sides of said frame part.

3. A knock sensor according to claim 1, wherein said sensing means is fixed to said pedestal at a surface side opposite to a rear side which faces said connector portion in said isolated interior.

4. A knock sensor according to claim 3, wherein said pedestal is fixed to said connector portion at said rear side thereof.

5. A knock sensor according to claim 4, wherein said sensing means is sealed in said interior from a remainder of said interior by a can and said pedestal.

6. A knock sensor according to claim 5, wherein said remainder of said interior is filled with an absorbing material.

7. A knock sensor according to claim 6, wherein said absorbing material is a silicone gel.

8. A knock sensor according to claim 1, wherein said resonant frequency of said sensing element is selected to be higher than said resonant frequency of said pedestal.

9. A knock sensor according to claim 8, wherein said resonant frequency of said sensing element is selected to be 60 kHz or more.

10. A knock sensor according to claim 1, wherein said geometry of each of said beam parts is selected to ensure that said resonant frequency of said sensing element is 60 kHz or more.

11. A knock sensor according to claim 1, wherein said detector includes a piezoresistance effect element disposed at least on said beam part.

12. A knock sensor according to claim 11, wherein said geometry of each of said beam parts is selected so as to make said resonant frequency of said sensing element 40 kHz or more as well as to make a sensitivity of said detector 12 µV/G or more.

13. A knock sensor according to claim 12, wherein each length of said beam parts from said frame part to said weight part is within a range of 0.05 mm to 0.215 mm.

14. A knock sensor according to claim 12, wherein each length of said beam parts from said frame part to said weight part is within a range of 0.05 mm to 0.1 mm.

15. A knock sensor according to claim 1, wherein said sensing means fixed to said pedestal further includes a signal processing element.

16. A knock sensor according to claim 15, wherein said signal processing element includes an amplifier circuit amplifying an output signal detected by said sensing element, a knock signal discriminating circuit determining an occurrence of said knocking based on an amplified signal from said amplifier circuit, and a power supply circuit supplying power to said circuits.

17. A knock sensor according to claim 15, wherein said pedestal is fixed to an inner wall of said interior at a peripheral portion of said pedestal, disposed positions of said sensing element and said signal processing element on said pedestal being shifted from a center of gravity of said pedestal.

18. A knock sensor according to claim 17, wherein an apparent centerpoint of gravity formed by said sensing element and said signal processing element is shifted from said center of gravity of said pedestal.

19. A knock sensor according to claim 1, wherein said weight part is suspended at two opposing sides of said frame part by two pairs of two adjacent beam parts, every beam part being provided with at least one piezoresistance effect element positioned proximately to one of 1) a connecting point between said frame part and said beam part and 2) a connection point between said weight part and said beam part.

20. A knock sensor according to claim 19, wherein every beam part is provided with one piezoresistance effect element, and wherein, in each of said two pairs of said two adjacent beam parts, on one of said two adjacent beam parts is disposed a piezoresistance effect element at a first side proximate to said connection point between said frame part and said beam part while on the other of said two adjacent beam parts is disposed a piezoresistance effect element at a second side proximate to said connection point between said weight part and said beam part.

21. A knock sensor according to claim 20, wherein four said piezoresistance effect elements form a Wheatstone bridge in which piezoresistance effect elements disposed on the respective beam parts at the same side of one of said first side and said second side are disposed at diagonally opposite sides of said Wheatstone bridge.

22. A knock sensor according to claim 19, wherein said frame part and said weight part have a thickness greater than a thickness of said beam parts.

23. A knock sensor according to claim 22, wherein a portion of one of said frame part and said weight part where said piezoresistance effect element is proximately disposed has a thickness the same as said thickness of said beam part continuously connected therefrom.

24. A knock sensor according to claim 22, wherein both marginal portions of said frame part and said weight part where said two pairs of said two adjacent beam parts connect therebetween have a thickness the same as said thickness of said beam parts.

25. A knock sensor, comprising:

a housing installed on an engine;

a connector portion assembled on said housing to form an isolated interior together with said housing, said connector portion including a lead electrically connecting between a side of said interior and a side of an exterior of said knock sensor;

a sensor element located inside said interior, comprising a frame part, a weight part set in said frame part to be apart from said frame part, and a plurality of beam parts connecting said weight part with said frame part to doubly support said weight part within said frame part, wherein said frame part, said weight part and said beam parts are formed of semiconductor substance; and piezoresistance effect elements disposed on said beam parts, respectively, to detect a vibration of said weight part responsive to a knocking occurring in said engine, wherein each of said beam parts has a geometry selected so as to make a resonant frequency of said sensing element 40 kHz or more to ensure that a maximum detection frequency of said detector is approximately 15 kHz.

26. A knock sensor according to claim 25, wherein each of said beam parts has a geometry selected so as to make a resonant frequency of said sensing element 40 kHz or more as well as to make a sensitivity of said piezoresistance effect elements 12 µV/G or more.

27. A knock sensor according to claim 25, wherein each length of said beam parts from said frame part to said weight part is within a range of 0.05 mm to 0.215 mm.

28. A knock sensor according to claim 25, wherein each length of said beam parts from said frame part to said weight part is within a range of 0.05 mm to 0.1 mm.

29. A knock sensor according to claim 25, further comprising a pedestal for fixing said sensing element thereon, disposed within said isolated interior and having a resonant frequency of 40 kHz or more.

30. A knock sensor according to claim 29, wherein said resonant frequency of said sensing element is selected to be higher than said resonant frequency of said pedestal.

31. A knock sensor according to claim 30, wherein said resonant frequency of said sensing element is selected to be 60 kHz or more.

* * * * *